United States Patent
Li et al.

(10) Patent No.: US 10,630,677 B1
(45) Date of Patent: Apr. 21, 2020

(54) SYSTEMS AND METHODS FOR PROTECTING USERS

(71) Applicant: Symantec Corporation, Mountain View, CA (US)

(72) Inventors: Qing Li, Cupertino, CA (US); Samir Kapuria, Bedford, MA (US)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 16/538,761

(22) Filed: Aug. 12, 2019

Related U.S. Application Data

(60) Provisional application No. 62/858,320, filed on Jun. 6, 2019.

(51) Int. Cl.
*G06F 15/173* (2006.01)
*H04L 29/06* (2006.01)
*G06Q 50/00* (2012.01)

(52) U.S. Cl.
CPC ........... *H04L 63/083* (2013.01); *G06Q 50/01* (2013.01); *H04L 63/0263* (2013.01); *H04L 63/107* (2013.01)

(58) Field of Classification Search
CPC . H04L 63/083; H04L 63/0263; H04L 63/107; G06Q 50/01
See application file for complete search history.

(56) References Cited

U.S. PATENT DOCUMENTS

| | | | |
|---|---|---|---|
| 9,094,360 B1* | 7/2015 | Bapat | H04L 63/102 |
| 2016/0112429 A1* | 4/2016 | Sundaresan | H04L 63/08 726/4 |
| 2016/0323257 A1* | 11/2016 | Kang | H04L 63/08 |
| 2017/0019390 A1* | 1/2017 | Gu | H04L 63/08 |
| 2017/0064550 A1* | 3/2017 | Sundaresan | H04W 12/06 |
| 2017/0208057 A1* | 7/2017 | Wang | H04L 63/083 |
| 2018/0241749 A1* | 8/2018 | Samuel | H04L 63/0876 |
| 2019/0108353 A1* | 4/2019 | Sadeh | G06N 20/20 |
| 2019/0253434 A1* | 8/2019 | Biyani | H04L 9/3226 |

* cited by examiner

Primary Examiner — Philip B Tran
(74) Attorney, Agent, or Firm — Fisher Broyles, LLP

(57) ABSTRACT

The disclosed computer-implemented method for protecting users may include (i) receiving, at an online social network from a first member of the online social network, a request to delegate an access right to an Internet-of-Things device possessed by the first member to a second member within the online social network to which the first member is connected as a social contact and (ii) granting, through the online social network, the request to delegate the access right to the Internet-of-Things device to the second member to provide the second member with at least a limited ability to interact with the Internet-of-Things device possessed by the first member of the online social network. Various other methods, systems, and computer-readable media are also disclosed.

20 Claims, 43 Drawing Sheets

SYSTEMS AND METHODS FOR PROTECTING USERS

CROSS-REFERENCES TO RELATED APPLICATIONS AND MATERIALS

This application claims priority to U.S. Provisional Patent Application Ser. No. 62/858,320, filed Jun. 6, 2019, titled "SYSTEMS AND METHODS FOR PROTECTING USERS," and the disclosure of this provisional application is incorporated by reference herein in its entirety.

Additionally, the following applications are incorporated by reference, in their entirety, and furthermore the modules, methods, systems, computer-readable mediums, and/or techniques disclosed (see the flow diagrams of FIGS. 2-6, etc.) in this specific application may leverage, coordinate with, utilize, and/or operate through the underlying technologies disclosed in these incorporated applications as would be appropriate, obvious, implicit, or inherent, or otherwise disclosed, to the reader having skill in the art, and as further discussed below:

U.S. patent application Ser. No. 16/263,330, filed Jan. 31, 2019, titled "SYSTEMS AND METHODS FOR IMPROVING NETWORK EFFICIENCY" (hereinafter "APPLICATION 1");

U.S. patent application Ser. No. 16/262,252, filed Jan. 30, 2019, titled "SYSTEMS AND METHODS FOR MANAGING DEVICES" (hereinafter "APPLICATION 2");

U.S. patent application Ser. No. 16/262,275, filed Jan. 30, 2019, titled "SYSTEMS AND METHODS FOR SECURING COMMUNICATIONS" (hereinafter "APPLICATION 3");

U.S. patent application Ser. No. 15/836,505, filed Dec. 8, 2017, titled "SYSTEMS AND METHODS FOR ANONYMIZING USER ACCOUNTS" (hereinafter "APPLICATION 4"); and U.S. patent application Ser. No. 13/645,258, filed Oct. 4, 2012, titled "SYSTEMS AND METHODS FOR ENABLING USERS OF SOCIAL-NETWORKING APPLICATIONS TO INTERACT USING VIRTUAL PERSONAS," and which also resulted in U.S. Pat. No. 9,321,969 (the resulting patent document, as distinct from the original application, is also incorporated by reference in its entirety) (hereinafter generally referred to as "APPLICATION 5").

The incorporation of each of the above listed applications is optional and subsequently one or more of these incorporation statements and/or corresponding references below to these incorporated applications may be optionally deleted without detracting from the original and non-incorporated subject matter that is further described in detail below (e.g., the methods and variations of methods corresponding to FIGS. 2-6).

BACKGROUND

The disclosed subject matter generally relates to the field of protecting users using security software and corresponding systems. More specifically, the disclosed subject matter may improve upon deficiencies or nonoptimal aspects of technologies that (i) help to secure a user's privacy and/or anonymity online, (ii) help users to securely share access to one or more devices, including Internet-of-Things devices, and/or (iii) help guardians, administrators, and others to effectively monitor or supervise computer activity by another user, such as an employee or a guardian's child. Specific details of the improvements disclosed herein within these general fields of technological subject matter are discussed in the detailed description below.

SUMMARY

As will be described in greater detail below, the present disclosure describes various systems and methods for protecting users. In one example, a computer-implemented method for protecting users may include (i) receiving, at an online social network from a first member of the online social network, a request to delegate an access right to an Internet-of-Things device possessed by the first member to a second member within the online social network to which the first member is connected as a social contact and (ii) granting, through the online social network, the request to delegate the access right to the Internet-of-Things device to the second member to provide the second member with at least a limited ability to interact with the Internet-of-Things device possessed by the first member of the online social network. In another example, a corresponding computer-readable medium may be encoded with computer-readable instructions that, when executed by a physical processor of a computing device, cause the computing device to perform this method.

In some examples, the online social network maintains a registry that matches registered user accounts of the online social network to delegation rights for Internet-of-Things devices. In further examples, the Internet-of-Things device is owned by the first member of the online social network.

In some examples, the online social network functions as a cloud-based proxy security service that masks at least one implementation detail for delegating the access right from the second member to protect a level of privacy of the first member of the online social network. In further examples, the implementation detail includes a local area network administrator login credential. In even further examples, the implementation detail includes a geolocation identifier of the Internet-of-Things device. In additional examples, the implementation detail includes an Internet protocol address corresponding to the Internet-of-Things device. In even further examples, the implementation detail includes an identifier of one Internet service provider that provides connectivity to the Internet-of-Things device.

In some examples, the online social network provides the limited ability to interact with the Internet-of-Things device to the second member through an application connecting the second member to the online social network. Additionally, in some examples, the online social network provides the limited ability to interact with the Internet-of-Things device without opening a port on a firewall protecting the Internet-of-Things device.

In one example, a corresponding system may include (i) a reception module, stored in memory, that receives, at an online social network from a first member of the online social network, a request to delegate an access right to an Internet-of-Things device possessed by the first member to a second member within the online social network to which the first member is connected as a social contact, (ii) a granting module, stored in memory, that grants, through the online social network, the request to delegate the access right to the Internet-of-Things device to the second member to provide the second member with at least a limited ability to interact with the Internet-of-Things device possessed by the first member of the online social network, and (iii) a physical processor configured to execute the reception module and the granting module.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
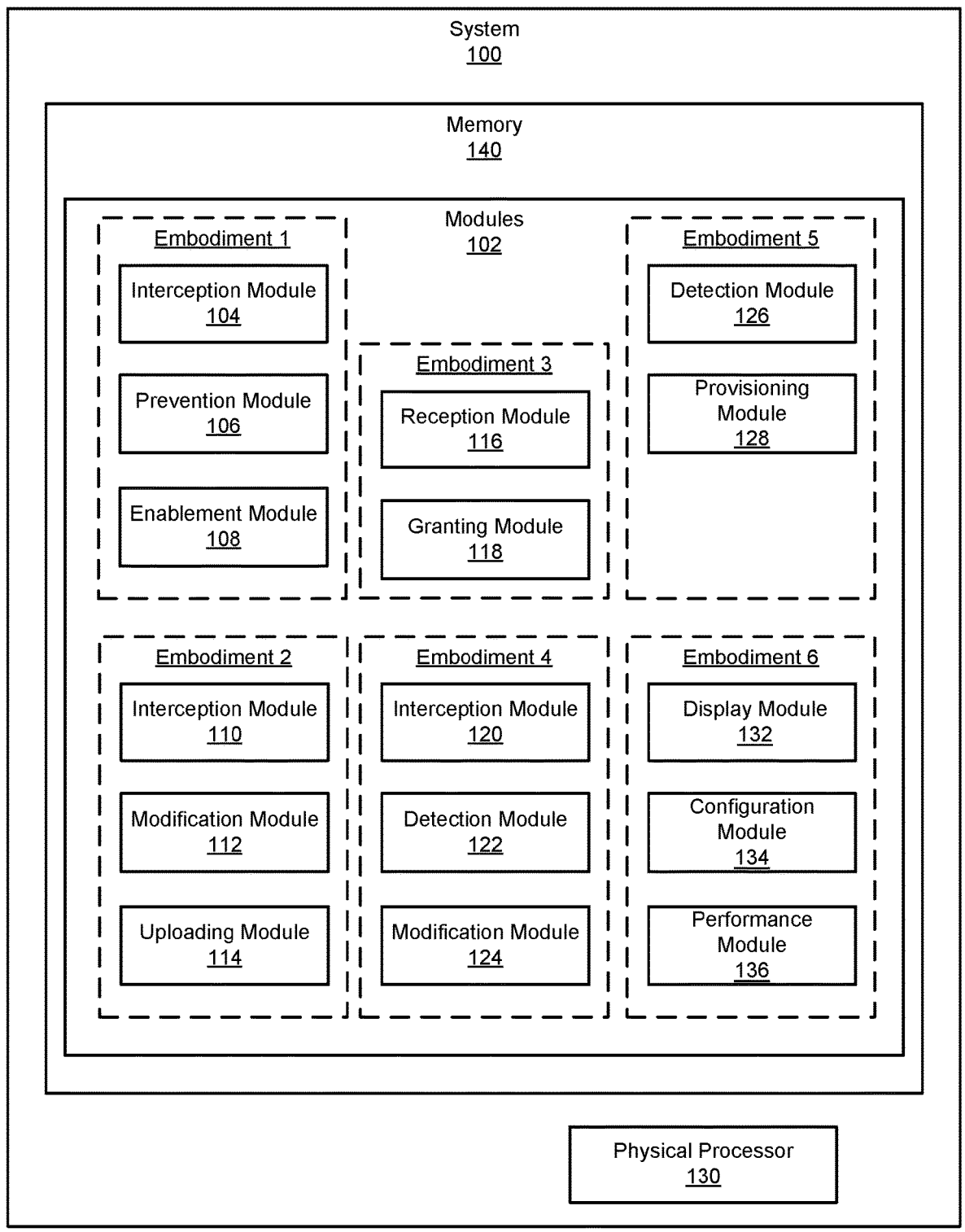
FIG. 1 is a block diagram of an example system for protecting users.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

FIG. 1 is a block diagram of example system 100 for protecting users. As illustrated in this figure, example system 100 may include one or more modules 102 for performing one or more tasks. Each one of these respective modules may perform a corresponding feature, action, or step for one of the embodiments of the disclosed subject matter, as will be discussed in more detail below in connection with the flow diagrams of FIGS. 2-6. In various embodiments, some or all of modules 102 may be disposed client-side and/or server-side, as appropriate, and consistent with the discussions below. In some illustrative examples, embodiments 1-4 shown in FIG. 1 here may operate through the underlying security proxy server technology described in more detail in APPLICATIONS 1-3 incorporated by reference above. Similarly, embodiments 1-2 here may improve upon, and address potential shortcomings of underlying identity-masking persona/avatar technology described in more detail in APPLICATIONS 4-5 incorporated by reference above. In particular, embodiment 3 here may operate through underlying technology described in APPLICATION 3 incorporated by reference above (describing techniques for managing Internet-of-Things devices). Generally speaking, some or most variations of embodiments 1-4 may operate server-side, as further described in the underlying cloud-based proxy server technology of APPLICATIONS 1-3. The parental control technology of embodiment 5, and the related technology of embodiment 6, herein may also optionally operate through the underlying cloud-based proxy server technology of APPLICATIONS 1-3 and/or may optionally operate locally through a local area network gateway, such as a smart home router that is security-centric, as discussed in more detail below. Of course, although embodiments 1-6 are shown separate from each other in FIG. 1, in some examples these embodiments may be combined or overlapped, as appropriate, and as discussed in more detail below.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting users. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
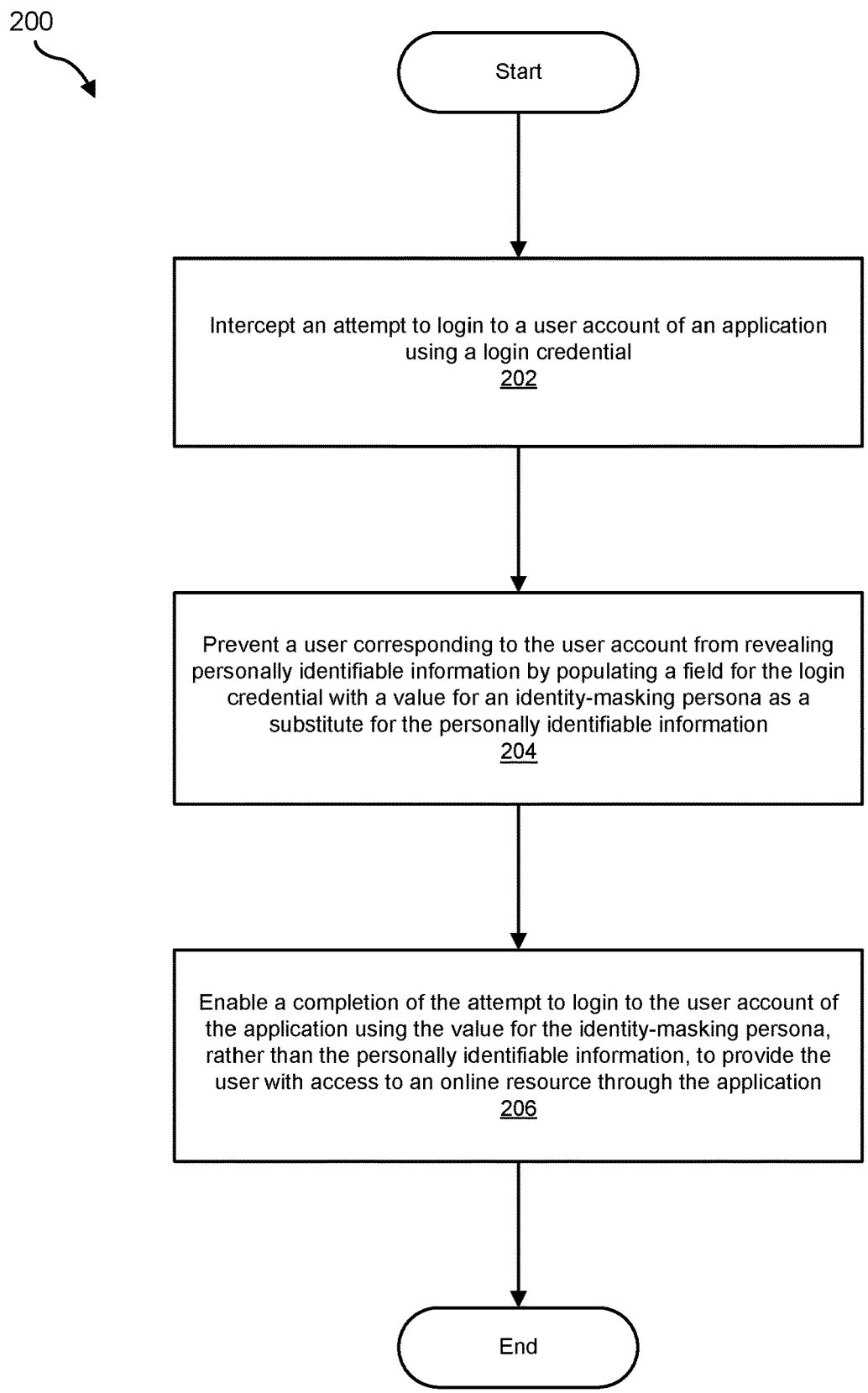
FIG. 2 is a flow diagram of an example method for protecting users.

FIG. 2 is a flow diagram of an example computer-implemented method 200 for protecting users. The steps shown in FIG. 2, and similarly for FIGS. 2-6, may be performed by any suitable computer-executable code and/or computing system, including system 100 in FIG. 1, and/or variations or combinations of one or more of the same. In one example, each of the steps shown in FIGS. 2-6 may represent an algorithm whose structure includes and/or is represented by multiple sub-steps, examples of which will be provided in greater detail below.

FIG. 2 is a flow diagram for method 200 corresponding to embodiment 1 of FIG. 1. Generally speaking, the modules of embodiment 1 shown in FIG. 1 may perform the respective steps of method 200. For example, at step 202, interception module 104 may intercept an attempt to login to a user account of an application using a login credential. At step 204, prevention module 106 may prevent the user corresponding to the user account from revealing personally identifiable information by populating a field for the login credential with a value for an identity-masking persona as a substitute for the personally identifiable information. At step 206, enablement module 108 may enable the completion of the attempt to login to the user account of the application using the value for the identity-masking persona, rather than the personally identifiable information, to provide the user with access to an online resource through the application.

Modules 102 may perform method 200 in a variety of ways. For example, interception module 104 may perform step 202 as part of a cloud-based proxy security service, including those described in APPLICATIONS 1-3 incorporated by reference above. Interception module 104 may, as part of the cloud-based proxy security service, perform step 202 in coordination with a client-side application at a client device operated by the user.

In some examples, the login credential may include a username and/or a password. Moreover, prevention module 106 may populate the field for the login credential at least in part by detecting that the field for the login credential was previously populated by personally identifiable information and/or substituting the value for the identity-masking persona for the personally identifiable information. Prevention module 106 may perform this detection and/or substitution procedure locally at the client device operated by the user and/or remotely through instructions from the proxy-side security service (e.g., the proxy-side security service may detect that the personally identifiable information was manually inserted locally at the client device and then transmit instructions to the client device to substitute the personally identifiable information with the identity-masking persona value).

In some examples, prevention module 106 may prevent the user corresponding to the user account from revealing the personally identifiable information at least in part by retrieving a map that maps identity-masking personas to corresponding applications and/or identified identity-masking persona that, according to the map, corresponds to the application. Furthermore, in some examples, enablement module 108 may enable the completion of the attempt to login to the user account of the application at least in part by presenting the field for the login credential populated with the value for the identity-masking persona to the user at the client device and/or receiving approval from the user at the client device for completion of the attempt to login to the user account of the application using the value for the identity-masking persona.

In some examples, the identity-masking persona deviates from the personally identifiable information along at least two of the following dimensions: underlying social media content, natural language usage, writing style, and/or social media meme usage. In further examples, the dimensions are consistent with each other in accordance with a demographic of the identity-masking persona and/or the demographic of the identity-masking persona that deviates from the personally identifiable information for the user. Additionally, in some examples, prevention module 106 may populate the field for the login credential with the value for the identity-masking persona at least in part by populating the field within a login screen according to an avatar of the identity-masking persona.

Although not further illustrated in a flow diagram within the drawings (for space and efficiency reasons), method 200 may also correspond to an alternative variation, which may be performed optionally by the modules of embodiment 2 shown in FIG. 1. In this alternative embodiment, interception module 110 may intercept an attempt by a user account of an application to upload an item of content to the application. Subsequently, modification module 112 may modify, automatically as part of an application configured to protect personally identifiable information of the user account, the item of content to increase a degree to which the item of content matches an identity-masking persona. Furthermore, uploading module 114 may upload the modified item of content rather than an original version of the item of content to help the user account benefit from privacy protection provided by the identity-masking persona.

Modules 102 may perform this alternative variation of method 200 in a variety of ways. In some examples, modification module 112 may modify the item of content to increase the degree to which the item of content matches the identity-masking persona at least in part by modifying a number of words included within the item of content. Additionally, or alternatively, modification module 112 may modify the item of content to increase the degree to which the item of content matches the identity-masking persona at least in part by modifying a writing style signature of the item of content.

Additionally, or alternatively, modification module 112 may modify the item of content to increase the degree to which the item of content matches the identity-masking persona at least in part by modifying a number of emojis included within the item of content. Furthermore, in some examples, modification module 112 may modify the item of content to increase the degree to which the item of content matches the identity-masking persona at least in part by modifying the item of content to increase a level of consistency with a demographic age of the identity-masking persona. Additionally, or alternatively, modification module 112 may modify the item of content to increase the degree to which the item of content matches the identity-masking persona at least in part by modifying the item of content to increase a level of consistency with a regional language style of the identity-masking persona.

Furthermore, in some examples, uploading module 114 may upload the modified item of content rather than the original version of the item of content at least in part by first prompting the user account to approve the modifying of the item of content and/or receiving approval from the user account of the modifying of the item of content. In further examples, first prompting the user account to approve the modifying of the item of content may include visually displaying the modified item of content to the user account. Moreover, in further examples, uploading module 114 may upload the modified item of content transparently as a background process. Additionally, or alternatively, uploading module 114 may upload the modified item of content transparently as the background process without intervention by the user account.

Figure 3:
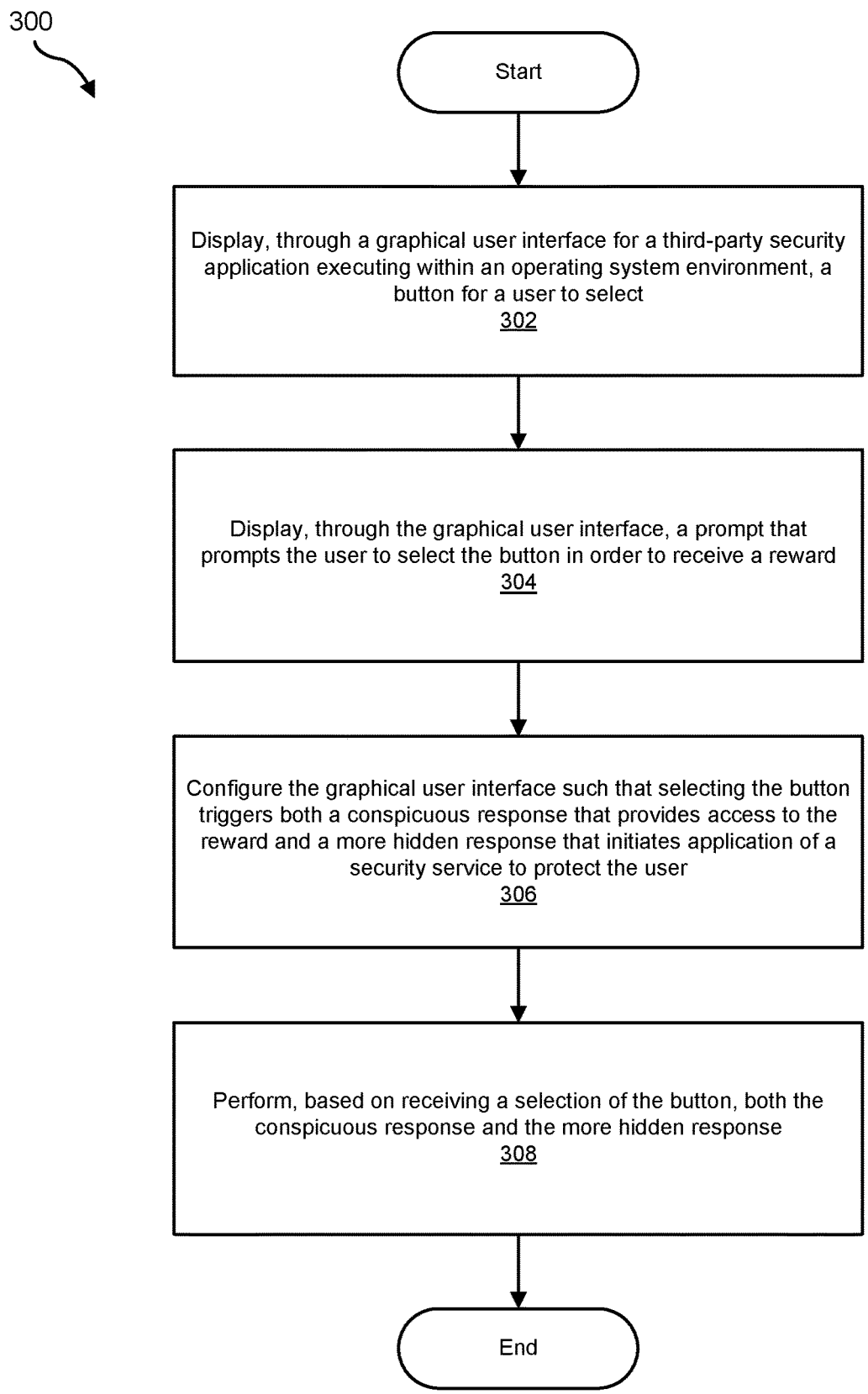
FIG. 3 is a flow diagram of an example method for protecting users.

FIG. 3 shows a flow diagram for a method 300 corresponding to embodiment 6 of FIG. 1. Generally speaking, the modules of embodiment 6 shown in FIG. 1 may perform the respective steps of method 300. At step 302, display module 132 may display, through a graphical user interface for a third-party security application executing within an operating system environment, a button for a user to select. At step 304, display module 132 may display, through the graphical user interface, a prompt that prompts the user to select the button in order to receive a reward. At step 306, configuration module 134 may configure the graphical user interface such that selecting the button triggers both a conspicuous response that provides access to the reward and a more hidden response that initiates application of a security service to protect the user. Subsequently, at step 308, performance module 136 may perform, based on receiving a selection of the button, both the conspicuous response and the more hidden response.

The modules of embodiment 6 may perform method 300 in a variety of ways. For example, the more hidden response may initiate one or more of multiple different options, including a virtual private network connection, a proxy security server connection that intercepts network traffic and applies a security policy to the intercepted network traffic, and/or a parental control service. Generally speaking, the more hidden response may correspond to a response that the user is less likely to initiate manually and independently (as distinct from initiating the hidden response invisibly together with the conspicuous response using the button of method 300). For example, the hidden response may correspond to a technical process that is potentially difficult or cumbersome for a non-technical user to complete (e.g., configuring a virtual private network). Additionally, or alternatively, the hidden response may correspond to the execution of software that the user does not necessarily desire or benefit from directly, but instead monitors or manages the user's behavior for the benefit of another party. For example, a child may not directly desire to benefit from parental control software, and therefore the child may not always consistently turn the parental control software on, whereas the guardian of the child may directly benefit and desire for the parental control software to be used more consistently. Accordingly, bundling the conspicuous response and the more hidden response together through the toggling of the graphical user interface button may help to prompt the user to more consistently trigger the hidden response.

In general, one illustrative example of the button of embodiment 6 may correspond to button 2002 of FIG. 20, as discussed in more detail below. Nevertheless, in other examples, the button may correspond to any suitable button that may be presented to a user by a graphical user interface, in accordance with method 300, to prompt the user, such as a protected child, to select or toggle the button and thereby receive a reward, as distinct from toggling a security service, which may nevertheless be additionally toggled, as discussed above.

In some examples, the graphical user interface omits displaying to the user any information regarding the more hidden response. Accordingly, the performance of the more hidden response may be partially, substantially, or entirely hidden (e.g., as a background process) from the user. Instead, the graphical user interface may focus on displaying prompts or other information that focus on the conspicuous response and its reward, as discussed further below.

In some examples, the operating system environment includes a mobile operating system environment that places a limit on an ability of the third-party security application to autonomously perform the hidden response without user intervention. Additionally, or alternatively, in this embodiment the graphical user interface may display the button and thereby prompt the user to provide the user intervention such that the limit on the ability of the third-party security application to autonomously perform the hidden response is circumvented.

Furthermore, in some examples, and as further discussed above, the more hidden response involves substantially more technical sophistication than the conspicuous response. Additionally, in these examples, the graphical user interface may display the button to thereby prompt the user to trigger the third-party security application to complete the process of the more hidden response despite the user lacking technical sophistication.

As first described above, in one example the user may include a protected child who is in a guardian-child relationship with the guardian. The guardian may furthermore administer a parental control system in connection with the third-party security application. Moreover, in these examples, the conspicuous response may provide the protected child with access to the reward, which the protected child may have earned through performing a security-based instructional exercise within the parental control system, as discussed further below. In more specific examples, the reward may include at least one of a monetary reward and/or an amount of network connectivity time.

Figure 4:
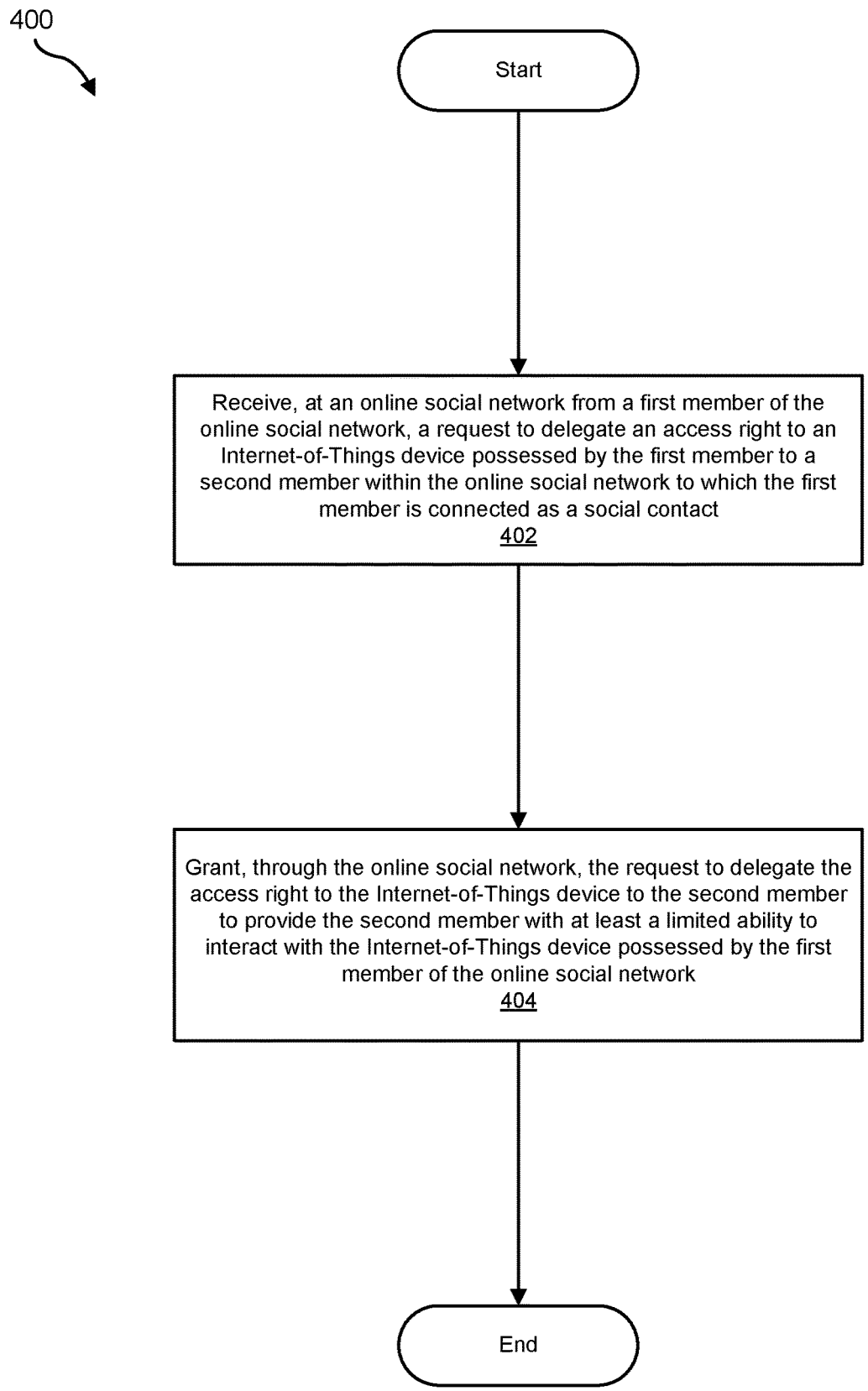
FIG. 4 is a flow diagram of an example method for protecting users.

FIG. 4 shows a flow diagram for a method 400 corresponding to embodiment 3 of FIG. 1. Generally speaking, the modules of embodiment 3 shown in FIG. 1 may perform the respective steps of method 400. At step 402, reception module 116 may receive, at an online social network from a first member of the online social network, a request to delegate an access right to an Internet-of-Things device possessed by the first member to a second member within the online social network to which the first member is connected as a social contact. At step 404, granting module 118 may grant, as part of the online social network, the request to delegate the access right to the Internet-of-Things device to the second member to provide the second member with at least a limited ability to interact with the Internet-of-Things device possessed by the first member of the online social network.

Modules 102 may perform method 400 in a variety of ways. For example, the online social network may optionally maintain a registry that matches registered user accounts of the online social network to delegation rights for Internet-of-Things devices. Furthermore, in some examples, the Internet-of-Things device is owned by the first member of the online social network.

Additionally, or alternatively, in some examples the online social network functions as a cloud-based proxy security service that masks at least one implementation detail for delegating the access right from the second member to protect a level of privacy of the first member of the online social network. In even further examples, the implementation detail may include at least one or more of the following: a local area network administrator login credential, a geolocation identifier of the Internet-of-Things device, an Internet protocol address corresponding to the Internet-of-Things device, and/or an identifier of one Internet service provider that provides connectivity to the Internet-of-Things device.

Additionally, or alternatively, the online social network may provide the limited ability to interact with the Internet-of-Things device to the second member through an application connecting the second member to the online social network. Furthermore, in some examples, the online social network provides the limited ability to interact with the Internet-of-Things device without opening a port on a firewall protecting the Internet-of-Things device.

Figure 5:
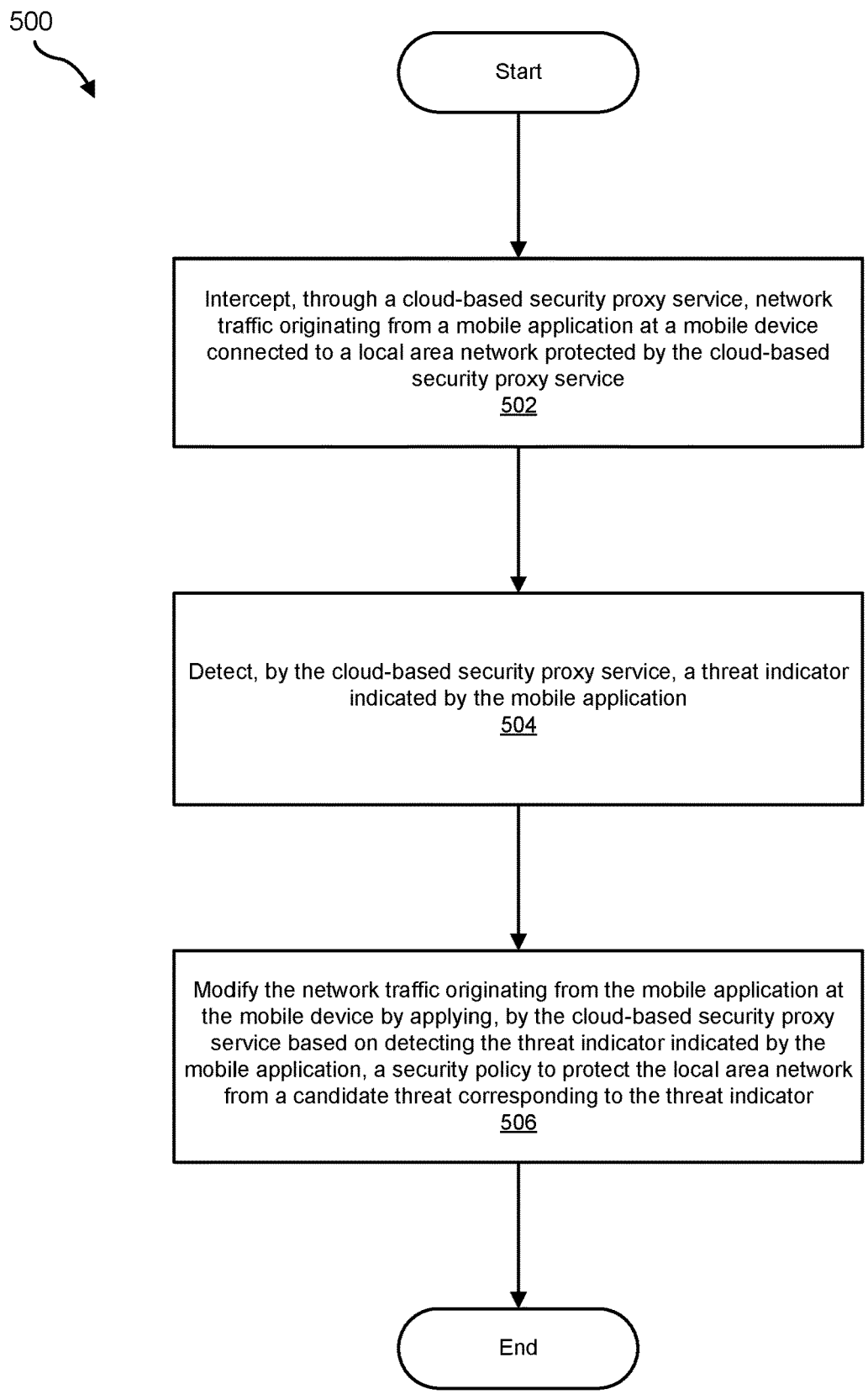
FIG. 5 is a flow diagram of an example method for protecting users.

FIG. 5 shows a flow diagram for a method 500 corresponding to embodiment 4 of FIG. 1. Generally speaking, the modules of embodiment 4 shown in FIG. 1 may perform the respective steps of method 500. For example, at step 502, interception module 120 may intercept, as part of a cloud-based security proxy service, network traffic originating from a mobile application at a mobile device connected to a local area network protected by the cloud-based security proxy service. At step 504, detection module 122 may detect, as part of the cloud-based security proxy service, a threat indicator indicated by the mobile application. At step 506, modification module 124 may modify the network traffic originating from the mobile application at the mobile device by applying, as part of the cloud-based security proxy service and based on detecting the threat indicator indicated by the mobile application, a security policy to protect the mobile device and the local area network from a candidate threat corresponding to the threat indicator.

Modules 102 may perform method 500 in a variety of ways. In some examples, modification module 124 may further provide to a monitoring computing device substantially real time visibility into the network traffic originating from the mobile application at the mobile device. Furthermore, modification module 124 may optionally provide the substantially real time visibility into the network traffic at least in part by displaying, within a graphical user interface, an indication activity by the mobile application at the mobile device.

In some examples, interception module 120 may perform the interception of the network traffic originating from the mobile application at the mobile device through the cloud-based security proxy service rather than intercepting the network traffic at the mobile device. Additionally, or alternatively, the mobile application at the mobile device may optionally continue to proceed executing without awareness of the modifying of the network traffic by the cloud-based security proxy service. Furthermore, in these examples, the mobile application may optionally effectively execute within a cloud-network-based sandbox and the mobile application may lack awareness of the cloud-network-based sandbox.

Additionally, or alternatively, detection module 122 may detect the threat indicator indicated by the mobile application at least in part by performing a behavioral analysis of behavior by the mobile application. Furthermore, in some examples, modification module 124 may modify the network traffic such that the modification is at least partially random. Furthermore, in some examples, modification module 124 may modify the network traffic at least in part by replacing at least a portion of the network traffic with decoy network traffic. Anonymization of the network traffic may prevent behavior fingerprinting of the mobile device or user. For example, modification module 124 may replace the portion of the network traffic with decoy network traffic at least in part by scrambling a location of the mobile device. Additionally, or alternatively, modification module 124 may replace the portion of the network traffic with decoy network traffic at least in part by modifying a contact list resulting in a decoy contact list.

Figure 6:
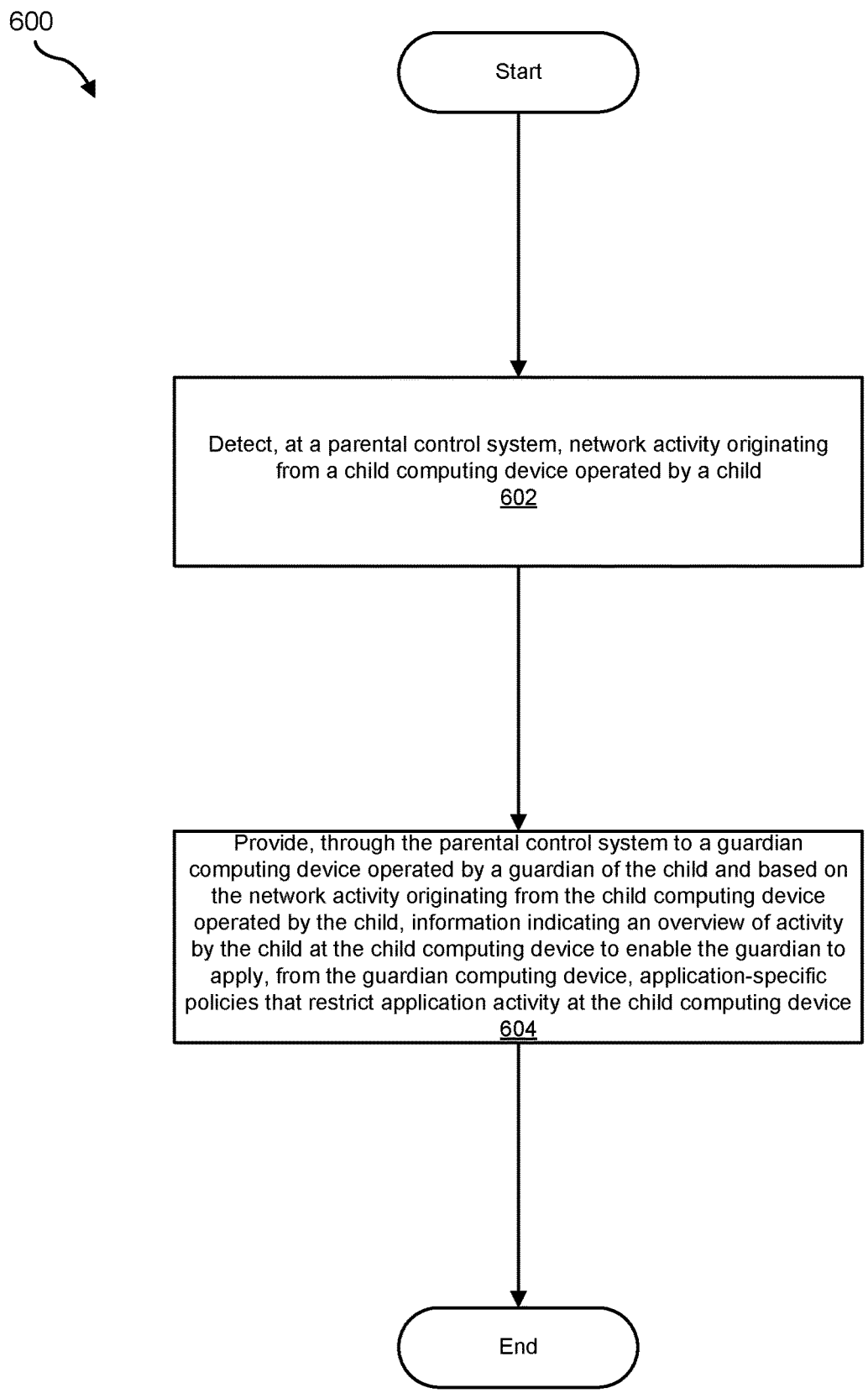
FIG. 6 is a flow diagram of an example method for protecting users.

FIG. 6 shows a flow diagram for a method 600 corresponding to embodiment 5 of FIG. 1. Generally speaking, the modules of embodiment 5 shown in FIG. 1 may perform the respective steps of method 600. For example, at step 602 detection module 126 may detect, as part of a parental control system, network activity originating from a child computing device operated by a child. At step 604, provisioning module 128 may provide, through the parental control system to a guardian computing device operated by a guardian of the child and based on the network activity originating from the child computing device operated by the child, information indicating an overview of activity by the child at the child computing device to enable the guardian to apply, from the guardian computing device, application-specific policies that restrict application activity at the child computing device.

Modules 102 may perform method 600 in a variety of ways. For example, provisioning module 128 may provide the information indicating the overview of activity at least in part by providing information indicating a comprehensive list of mobile applications installed on the child computing device. Additionally, or alternatively, provisioning module 128 may provide the information indicating the overview of activity at least in part by providing information indicating a comprehensive list of mobile applications executing on the child computing device.

Furthermore, in some examples, provisioning module 128 may provide the information indicating the overview of activity that enables the guardian to offer a reward in exchange for the child performing an instructional activity that instructs the child regarding computing network security. In these examples, the reward optionally may include at least one of a financial or monetary reward and/or an allotment of network connectivity time. Furthermore, in some examples, a client-side parental control application at the child computing device requests for the child to manually toggle a button to trigger release of the reward.

Additionally, or alternatively, in some examples provisioning module 128 may provide the information indicating the overview of activity by the child such that the information enables the guardian at the guardian computing device to throttle performance by an application of the child computing device along at least one dimension.

In some examples, the parental control system may be centralized through a home local area network router. Additionally, or alternatively, in further examples the parental control system may be centralized through a cloud-based proxy security server. Furthermore, in some examples, the parental control system may optionally enable the guardian at the guardian computing device to apply an application-specific policy for one application at the child computing device that is different than another application-specific policy applied to a second application at the child computing device.

Figure 7:
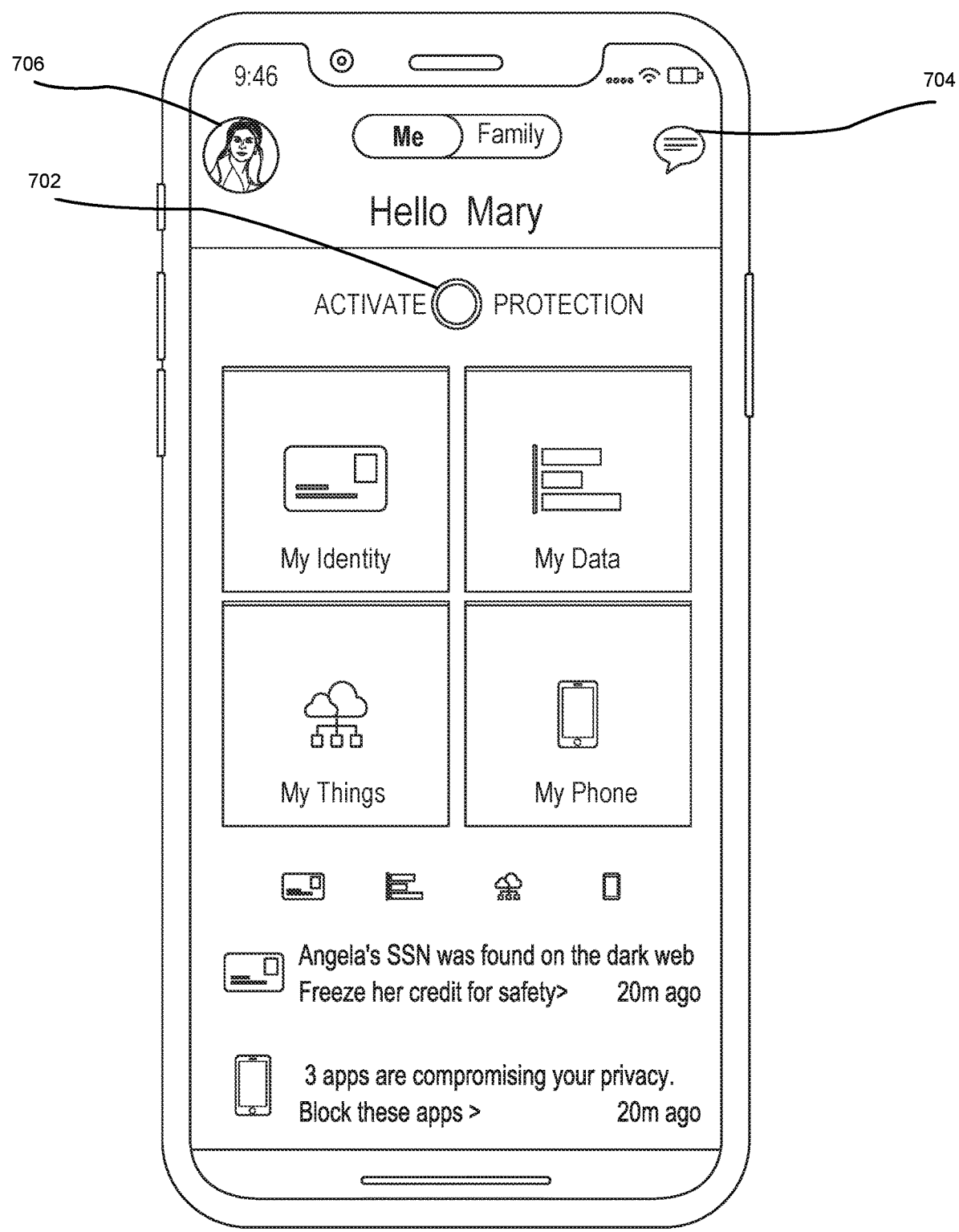
FIGS. 7-41 show example graphical user interfaces.

FIG. 7 shows an illustrative example of a graphical user interface for a client-side security-centric mobile application that the user may use in connection with one or more of embodiments 1-5 outlined above. As further shown in this figure, the graphical user interface may specify an introductory greeting ("Hello Mary"). Furthermore, graphical user interface may include an "activate protection" button 702, which the user may toggle to begin or activate security protections according to one or more of the embodiments 1-5. The graphical user interface may further include four separate buttons, which specify "my identity," "my data," "my things," and "my phone," which the user may toggle, respectively, to further navigate to options for one or more security features or functionalities, as discussed in more detail below. The graphical user interface also includes a chat icon button 704 on the top right, a profile picture 706 on the top left, and also news feed notifications on the bottom, which may notify the user about potential privacy compromises on the dark web and/or notify the user about applications on the user's local mobile device that may potentially compromise the user's privacy along one or more dimensions.

Figure 8:
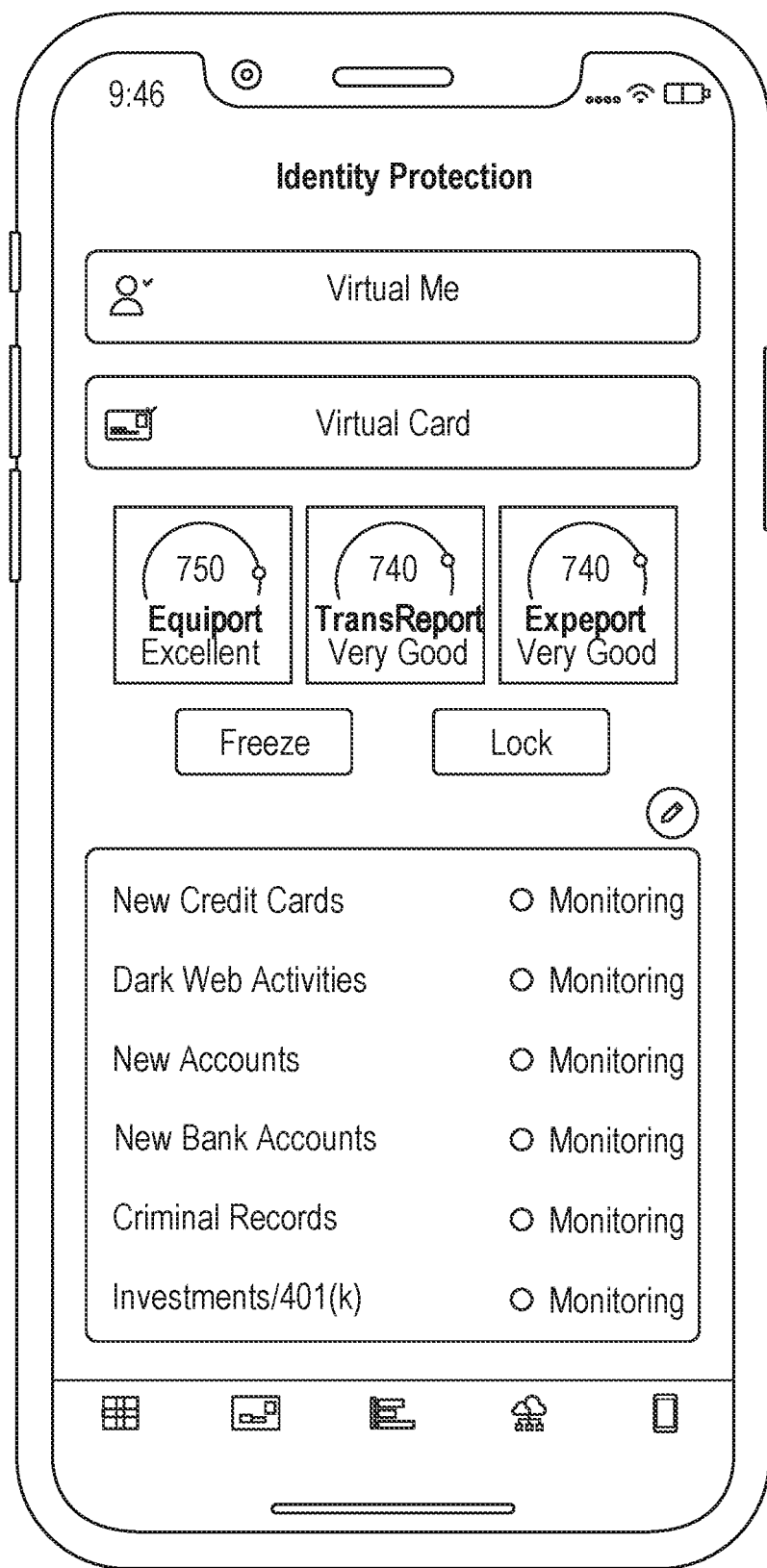

FIG. 8 further shows an example of the graphical user interface, corresponding to the user's navigation, after selecting the "my identity" button within the interface previously shown in FIG. 7. As further shown in FIG. 8, the graphical user interface may show display options for "virtual me" and "virtual card," which may help the user to navigate to options for leveraging or utilizing one or more identity-masking personas as avatars, as discussed in more detail above, especially in connection with embodiments 1-2. The graphical user interface of FIG. 8 also shows how the user may be immediately visually notified with indications of credit scores from three separate credit score providers. The graphical user interface also includes options to "freeze" or "lock," which may perform corresponding freezing or locking actions to help protect the user's identity or credit score. The graphical user interface also displays indicators showing that each of the following monitoring functionalities has been activated: monitoring for new credit cards, monitoring for dark web activities, monitoring for new accounts, monitoring for new bank accounts, monitoring for criminal records, and/or monitoring for investments or 401(k) activity.

Figure 9:
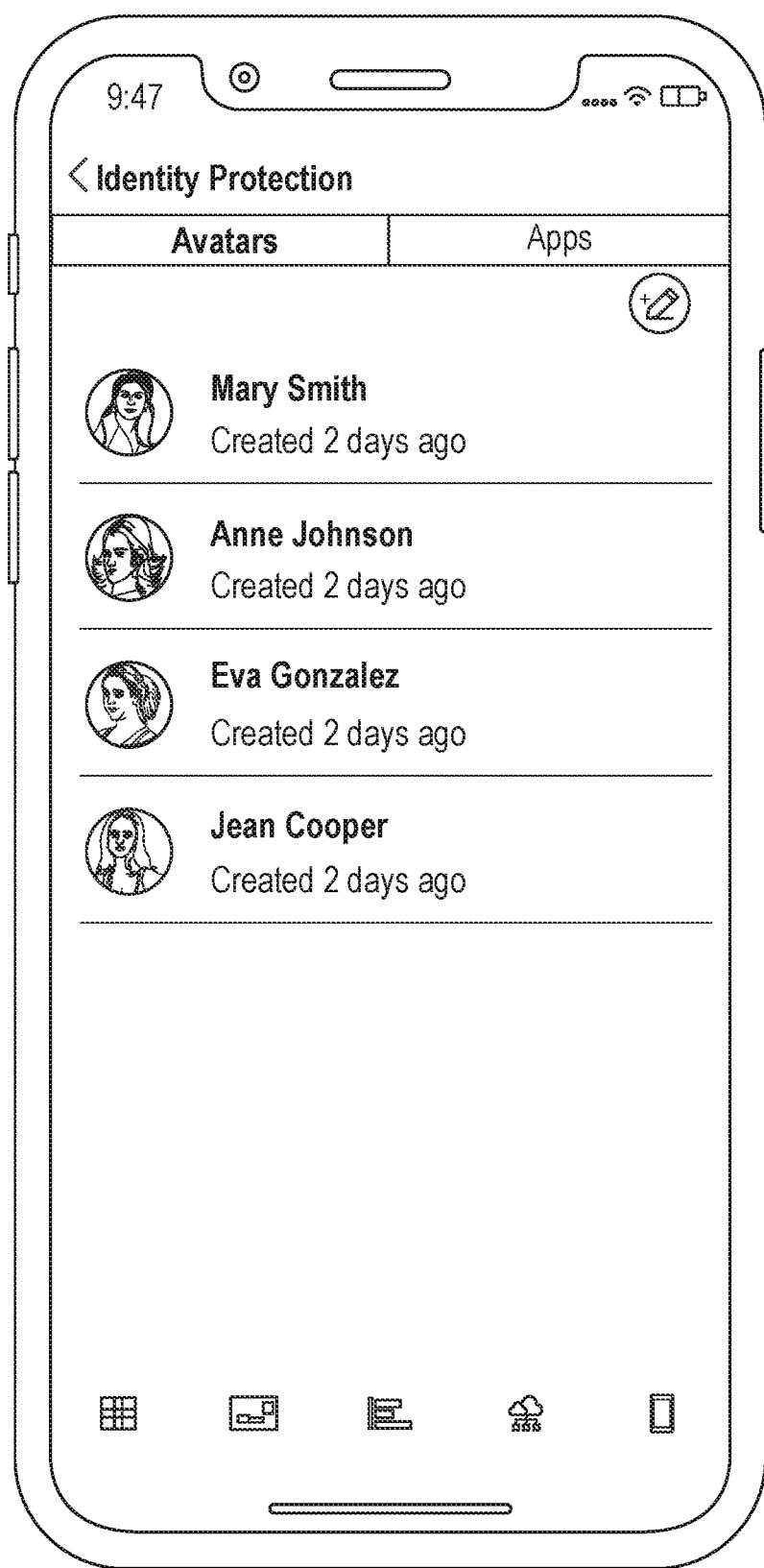

FIG. 9 further shows an example of a graphical user interface, corresponding to the user's navigation, after the user previously selected the "virtual me" button within the interface previously shown in FIG. 8. As further shown in this figure, the graphical user interface of FIG. 9 may include a list of avatars, including four separate avatars, Mary Smith, Anne Johnson, Eva Gonzales, and Jean Cooper. The user may toggle or trigger the display of the list of avatars by selecting the "avatars" icon or button at the top left of the graphical user interface. Alternatively, the user may select the "apps" icon or button at the top right of the graphical user interface to trigger the display of a corresponding list of mobile applications. Moreover, in this example, the graphical user interface may also specify a timing indicating the timing since when each specific avatar was previously created ("Created 2 days ago").

Figure 10:
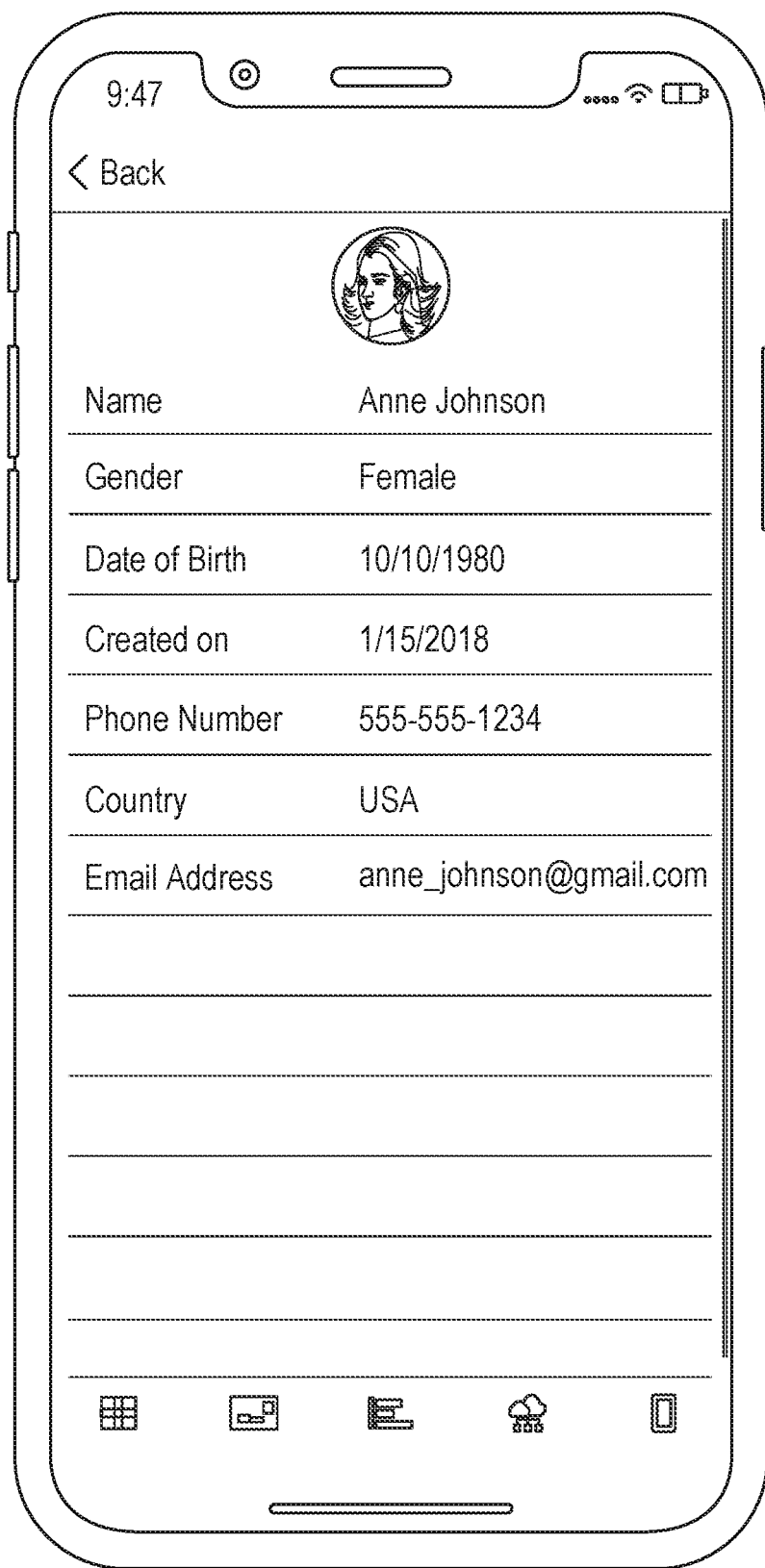

FIG. 10 shows an example graphical user interface, corresponding to the user's navigation, after the user selected or indicated the example avatar of "Anne Johnson" in the previous graphical user interface of FIG. 9. As further shown in this figure, the graphical user interface of FIG. 10 may show multiple items of information regarding a specific avatar. For example, the graphical user interface may display a profile icon for the avatar. Similarly, the graphical user interface may display a list of fields, on the left-hand column, and also values for these corresponding fields, on the right-hand column. These fields may include the name, gender, date of birth, "created on" date, phone number, country, and email address for the specific avatar. Moreover, the graphical user interface of FIG. 10 further illustrates how each one of these fields may be populated with the specific respective decoy value, thereby providing the avatar with decoy information with which to protect the user's underlying personally identifiable information.

Figure 11:
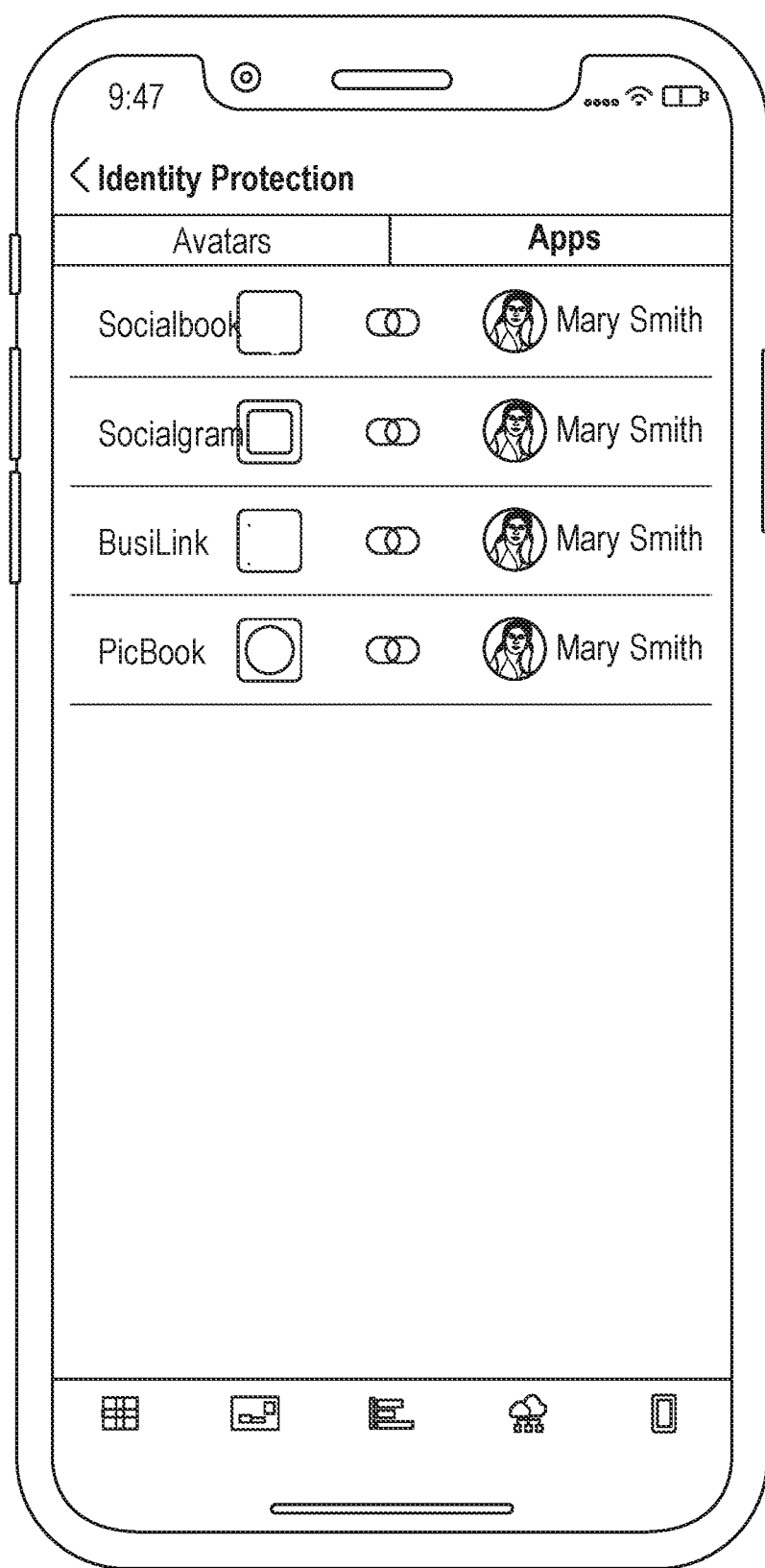

FIG. 11 shows an example graphical user interface, corresponding to the user's navigation, after the user has returned to the graphical user interface screen of FIG. 9 and then subsequently selected the "apps" icon or button. Selecting the "apps" button, or any suitable corresponding button, may thereby trigger the graphical user interface to further display the screen of FIG. 11. As further shown in this figure, the graphical user interface may display a list of mobile applications, or other applications, on the left-hand side. Moreover, the graphical user interface may also enable the user to link or associate (e.g., as indicated by the "chain" indicator in the middle column of FIG. 11) each one of the mobile applications with a respective avatar, from the list of available avatars previously discussed in connection with FIG. 9. In the specific example of FIG. 11, each one of the available mobile applications has already been linked to the same specific avatar of "Mary Smith." Nevertheless, this example is merely illustrative and, in other examples, the user may optionally specify different respective avatars to correspond to different respective mobile applications, thereby using different avatars for different applications rather than the same avatar for all of them.

Figure 12:
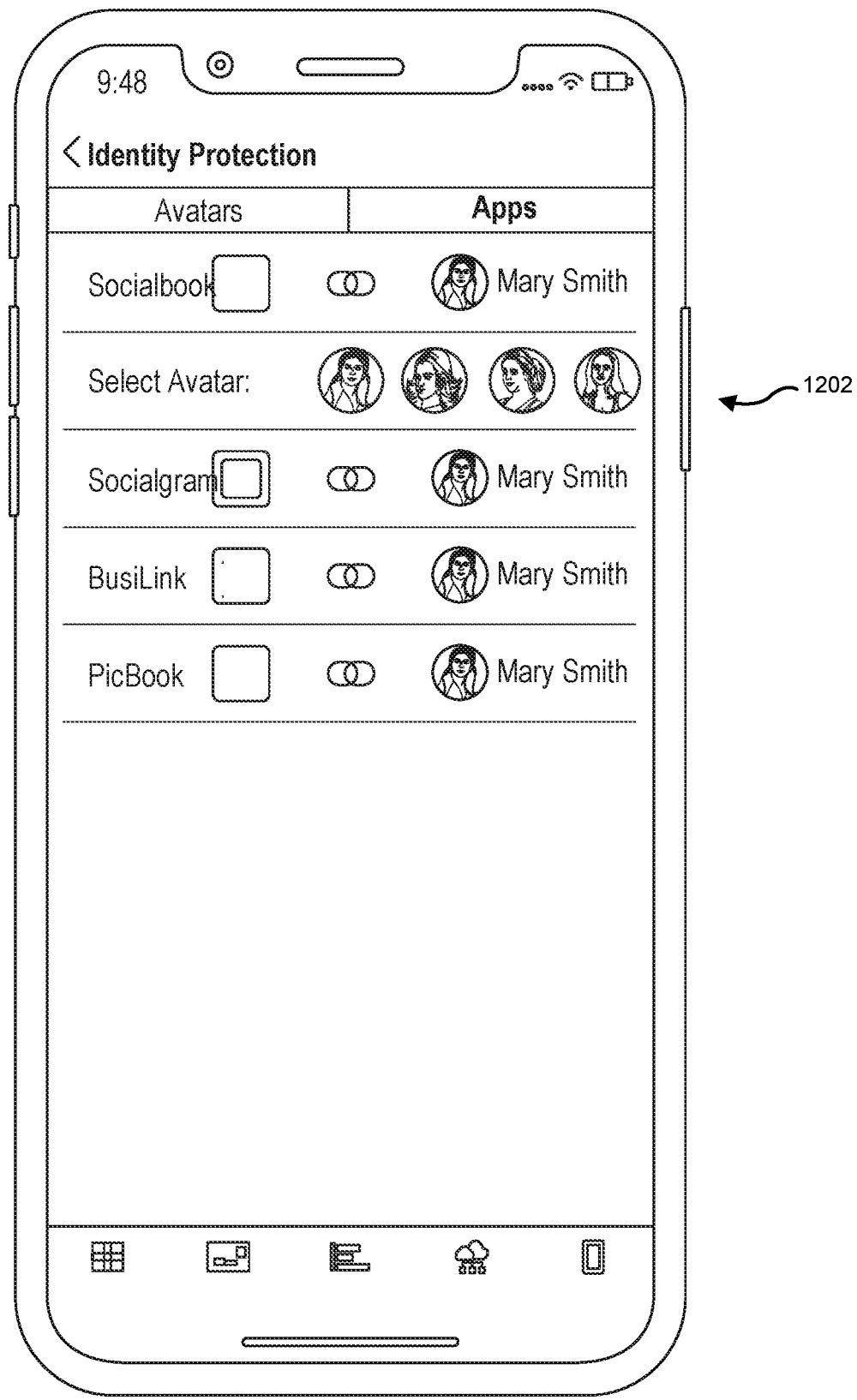
Figure 13:
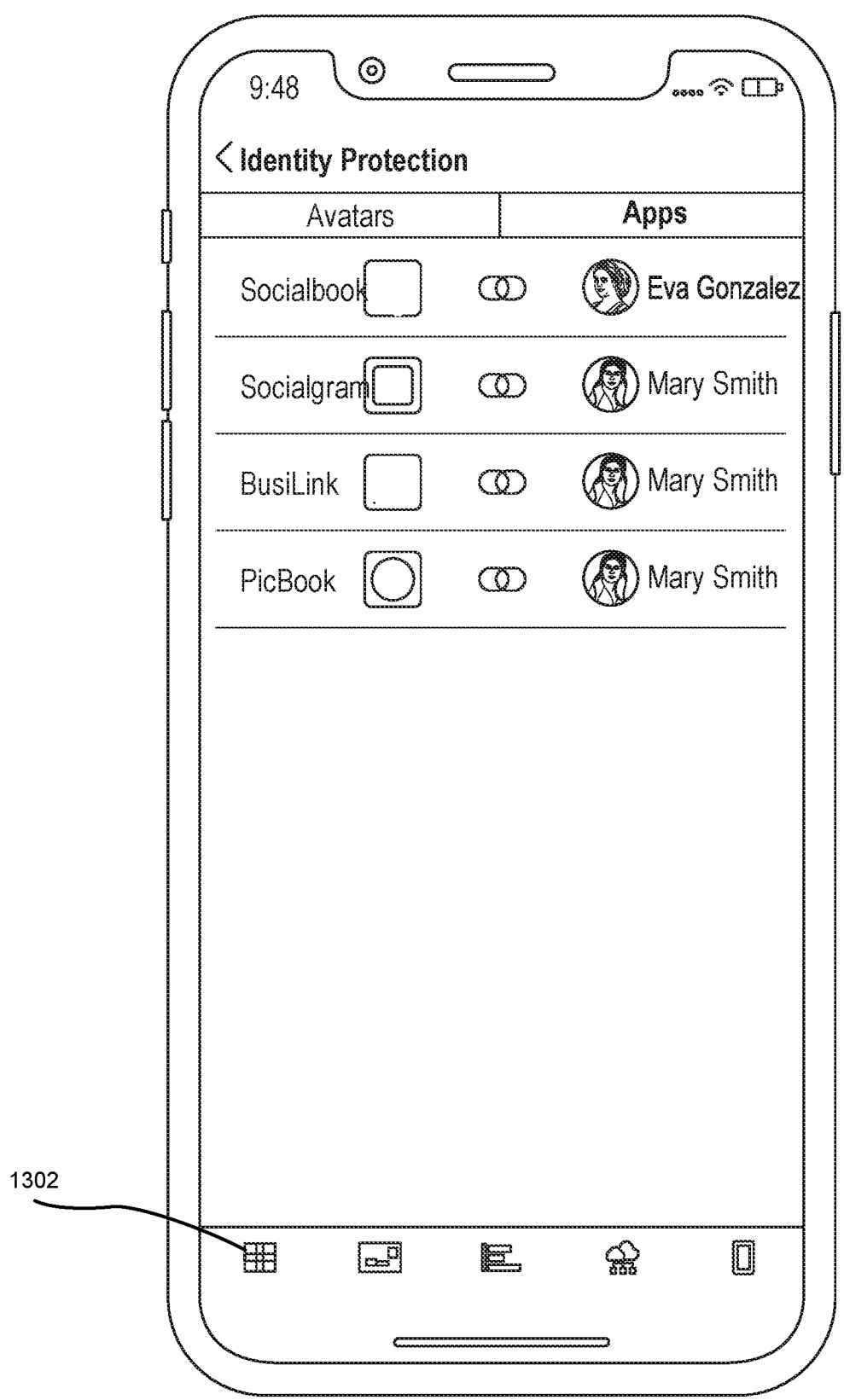

FIG. 12 shows an example graphical user interface, corresponding to the user's navigation, after the user has selected the "chain" indicator within the graphical user interface of FIG. 11 (or any other suitable button/element) thereby triggering the graphical user interface to further display a list of available avatars to be linked, or associated, with a specific or respective mobile application. In the example of FIG. 12, the list of available avatars are indicated to the user in the form of small profile pictures in a horizontal sequence 1202. Nevertheless, in alternative examples, the list of available avatars may be displayed to the user using any suitable display or graphical user interface sequence. As further shown in the example of FIG. 12, the graphical user interface may further display to the user an indicator specifying "Select Avatar," and in response, the user may select one of the small profile pictures to further select the corresponding avatar from the list of available avatars, corresponding to those previously shown in FIG. 9, and discussed in more detail above. The user may thereby link, or associate, the specific avatar with the respective mobile application. For confirmation, FIG. 13 further shows an example of the graphical user interface, after the user has previously selected the small profile picture for "Eva Gonzales," thereby linking, or associating, that specific avatar with the respective mobile application.

Figure 14:
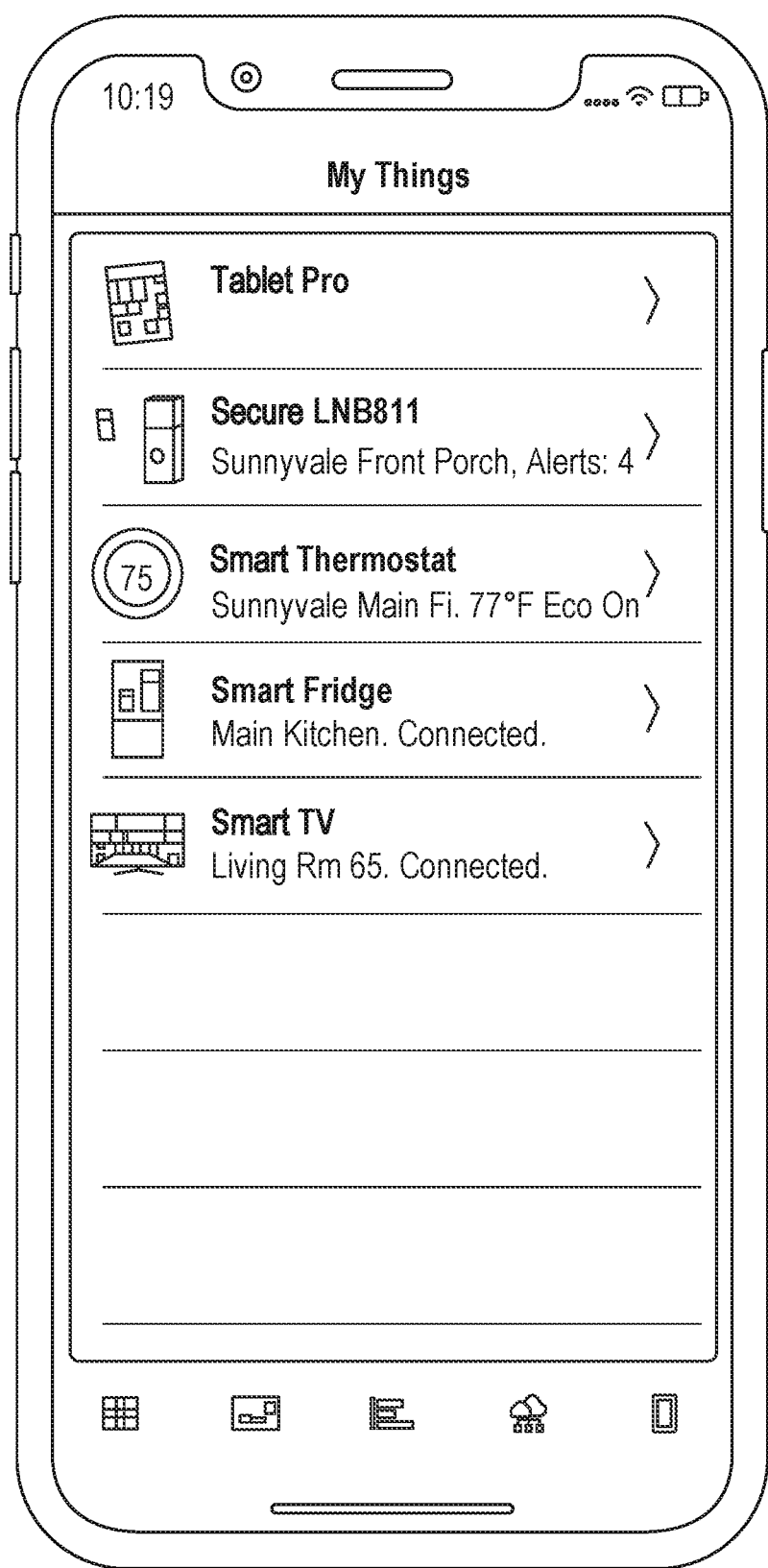

FIG. 14 shows an example graphical user interface displayed to the user after the user has previously navigated back to the home screen of FIG. 7 and, at the home screen of FIG. 7, selected the "my things" button, as discussed in more detail below. From the screen of FIG. 13, the user may navigate to the home screen by selecting a small "home screen" icon 1302 on the bottom left of the FIG. 13 graphical user interface (i.e., to the left of the small credit card icon on the bottom of the screen). The graphical user interface of FIG. 14 further displays to the user a list of devices, including especially Internet-of-Things devices, that the user may manage, for security purposes, through the client-side application in coordination with the cloud-based proxy security service of the embodiments 1-4 and APPLICATIONS 1-3 discussed in more detail below. More specifically, the example of FIG. 14 shows a list of a tablet, a home security or video security interface, a smart thermostat, a smart fridge, and/or a smart television, each of which the user may help manage or manipulate according to the embodiments described herein.

Figure 15:
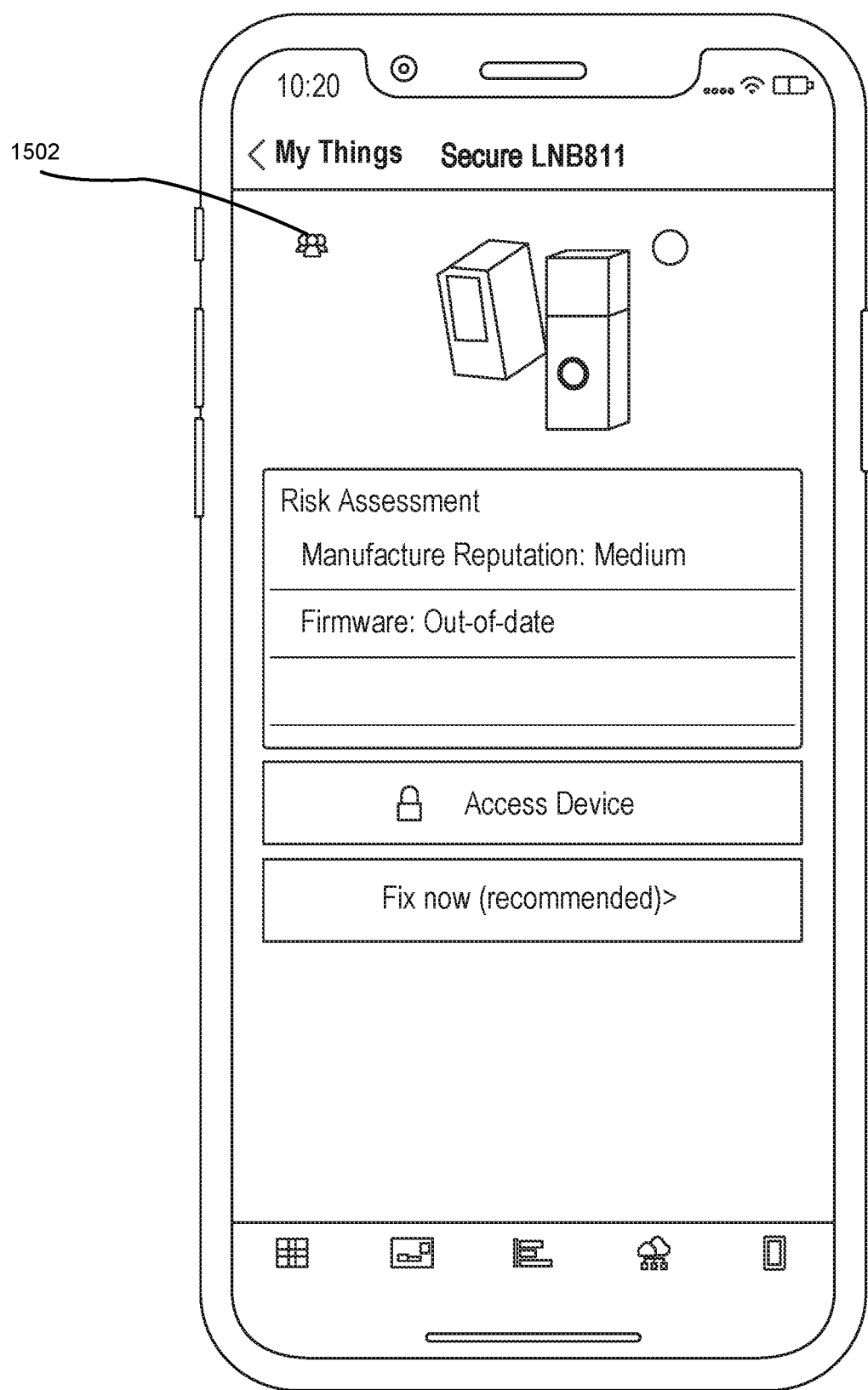

FIG. 15 shows an example graphical user interface displayed to the user after the user has previously selected the home security system from the list of managed devices shown in FIG. 14. As further shown in this figure, the graphical user interface may display to the user a risk assessment, which may include an indication of the reputation for the manufacture (e.g., "medium") and/or an indication of the reputation or evaluation for the corresponding firmware (e.g., "out-of-date"). The graphical user interface also displays a small photographic icon for the smart home security system at the top of the display. Furthermore, closer to the bottom of the display, the graphical user interface may also show a button or element for the user to select to access options or functionalities for the device and/or a button or element for the user to select to "fix" or remediate the device (e.g., a "fix now" button).

Notably, at the top left of the screen corresponding to FIG. 15, there is also a "friends" or "people" icon 1502, which further includes a larger user icon at the center and two smaller user icons on the right-hand side and left-hand side of the larger user icon and behind the larger user icon. The user may optionally select icon 1502, thereby triggering the display of the graphical user interface of FIG. 16, as discussed in more detail below.

Figure 16:
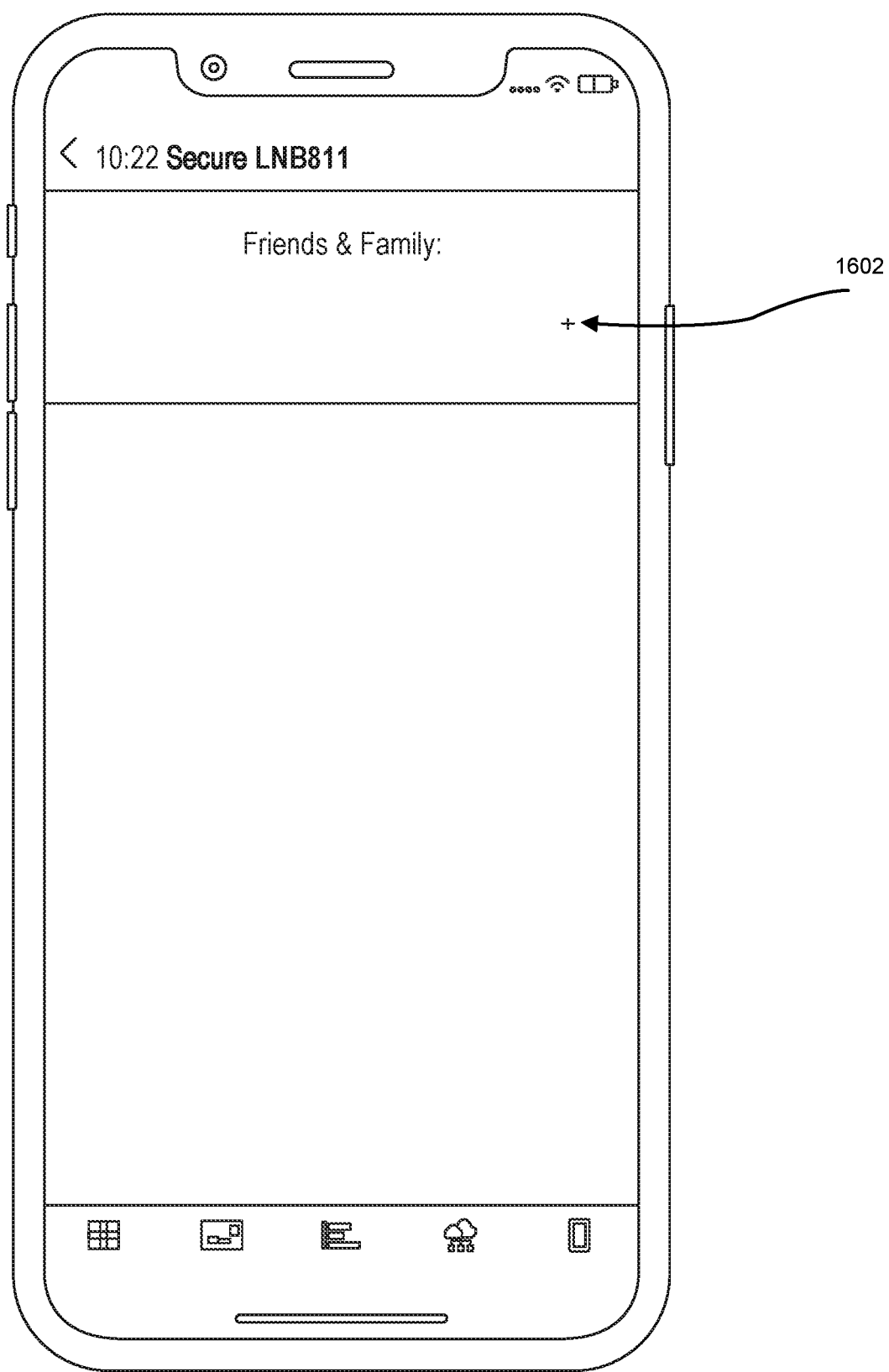

As further shown in FIG. 16, the graphical user interface may display an alphanumeric identifier for the selected device to be managed (e.g., a security or video system). Moreover, the graphical user interface may also display a title, "Friends & Family," thereby further indicating that the user has a list of friends and family who have been delegated at least one or more access rights to access or interact with the selected device. In the example of FIG. 16, this list of friends and family has not yet been populated with any users. Accordingly, the user may optionally toggle the "+" or plus icon 1602 at the top right of the screen of FIG. 16, thereby enabling the user to select one or more contacts within the corresponding social network, to thereby create one or more access rights to access, or interact with, the selected device. The screens of FIG. 15 and FIG. 16 optionally correspond to embodiment 3 of FIG. 1, as discussed and outlined in more detail above.

Figure 17:
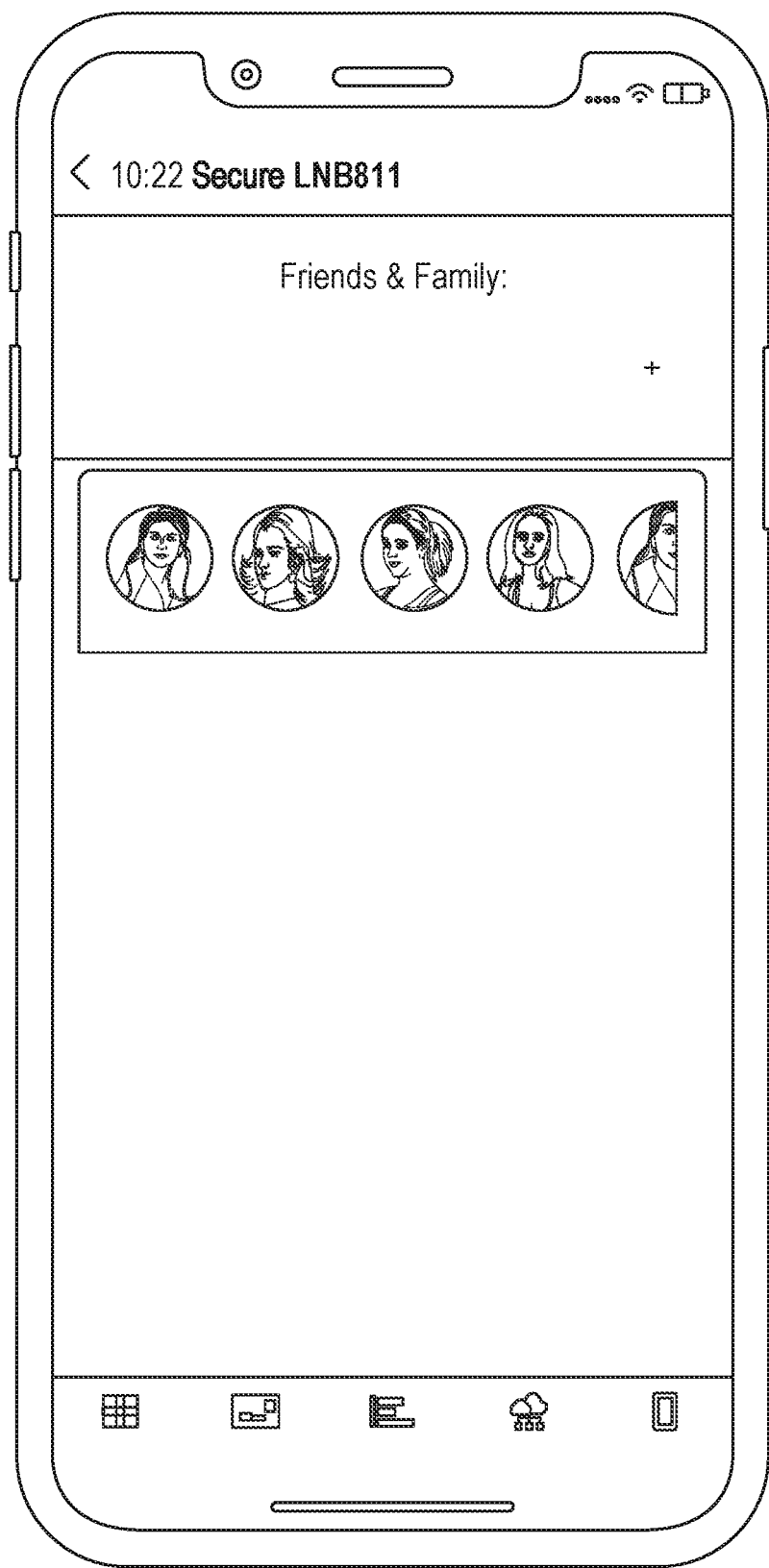

FIG. 17 shows an example graphical user interface with a horizontal sequence of user profile pictures, which further correspond to available user accounts, within a corresponding online social network, to which the user may optionally delegate one or more access rights to the selected device of FIG. 15. In the example of FIG. 17, the user may optionally swipe left to right to pull or drag the list of available contacts, thereby viewing more and more available contacts from which to select as the target for granting of access rights to the selected device.

Figure 18:
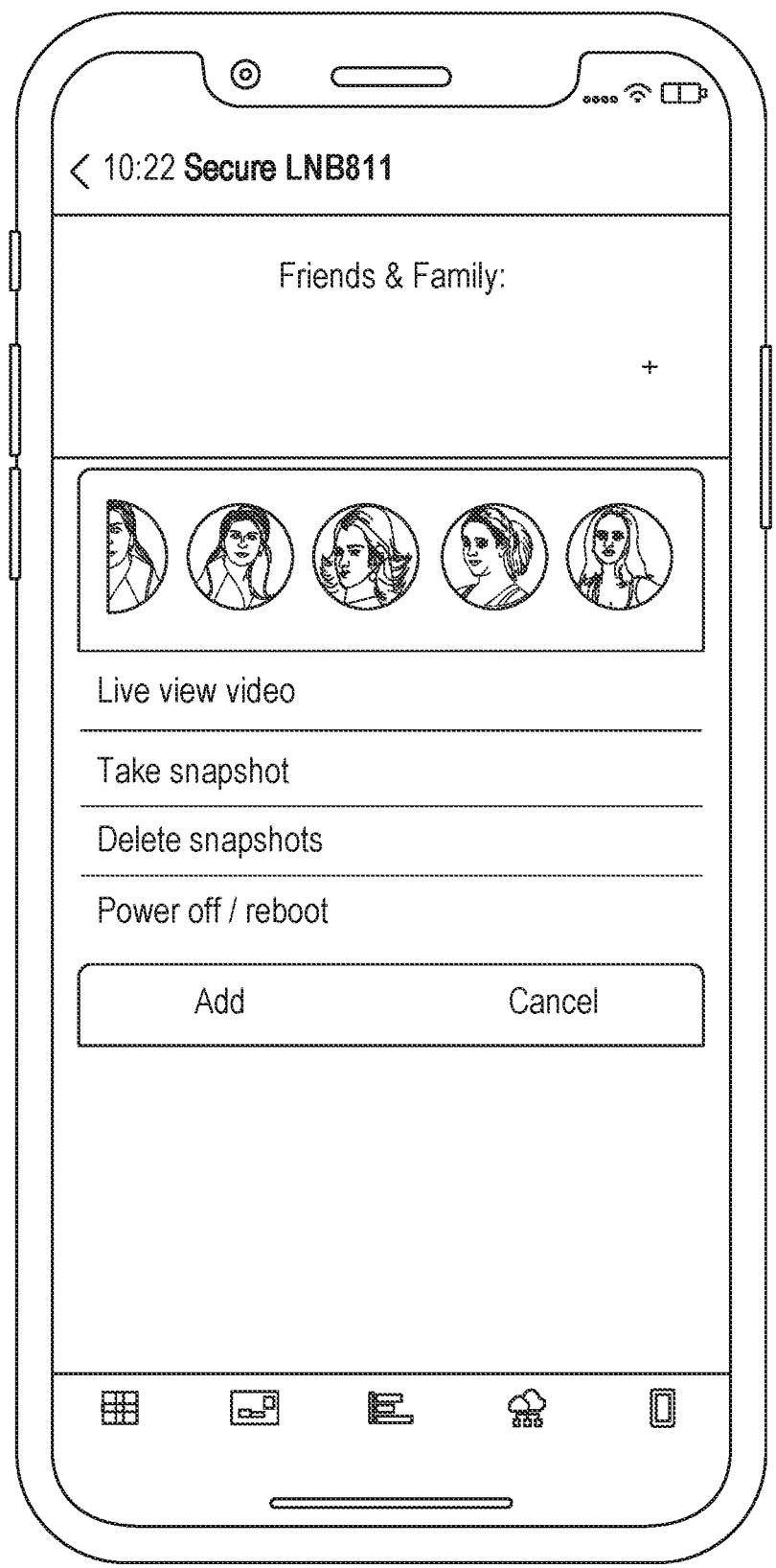

FIG. 18 shows an example of the graphical user interface, which may further display the additional information about one available contact, after the user has selected that specific contact by clicking upon, or otherwise toggling, the corresponding small user icon for that specific contact. As further shown in this figure, the graphical user interface may optionally display a list of available access rights that the user may potentially grant to the selected contact, where each of these access rights provides a level of access or interactivity with the selected device of FIG. 15 (e.g., the previously selected home security or video security system). FIG. 18 further shows that these access rights, which are available for granting to the selected contact, may include "live view video," "take snapshot," "delete snapshot," and/or "power off/reboot." Accordingly, these different available access rights may provide a selected contact, upon being granted with the corresponding access right, with the ability to view live video through the home security video system, to take a snapshot through the system, to delete one or more snapshots, and/or to power off/reboot the home security video system. Of course, the user is not required to grant all of these different access rights to the same single contact and, instead, may grant one or more permutations of these access rights to one or more contacts while also granting one or more permutations of these access rights to a different set of one or more contacts, thereby completing a process of access right delegation.

Figure 19:
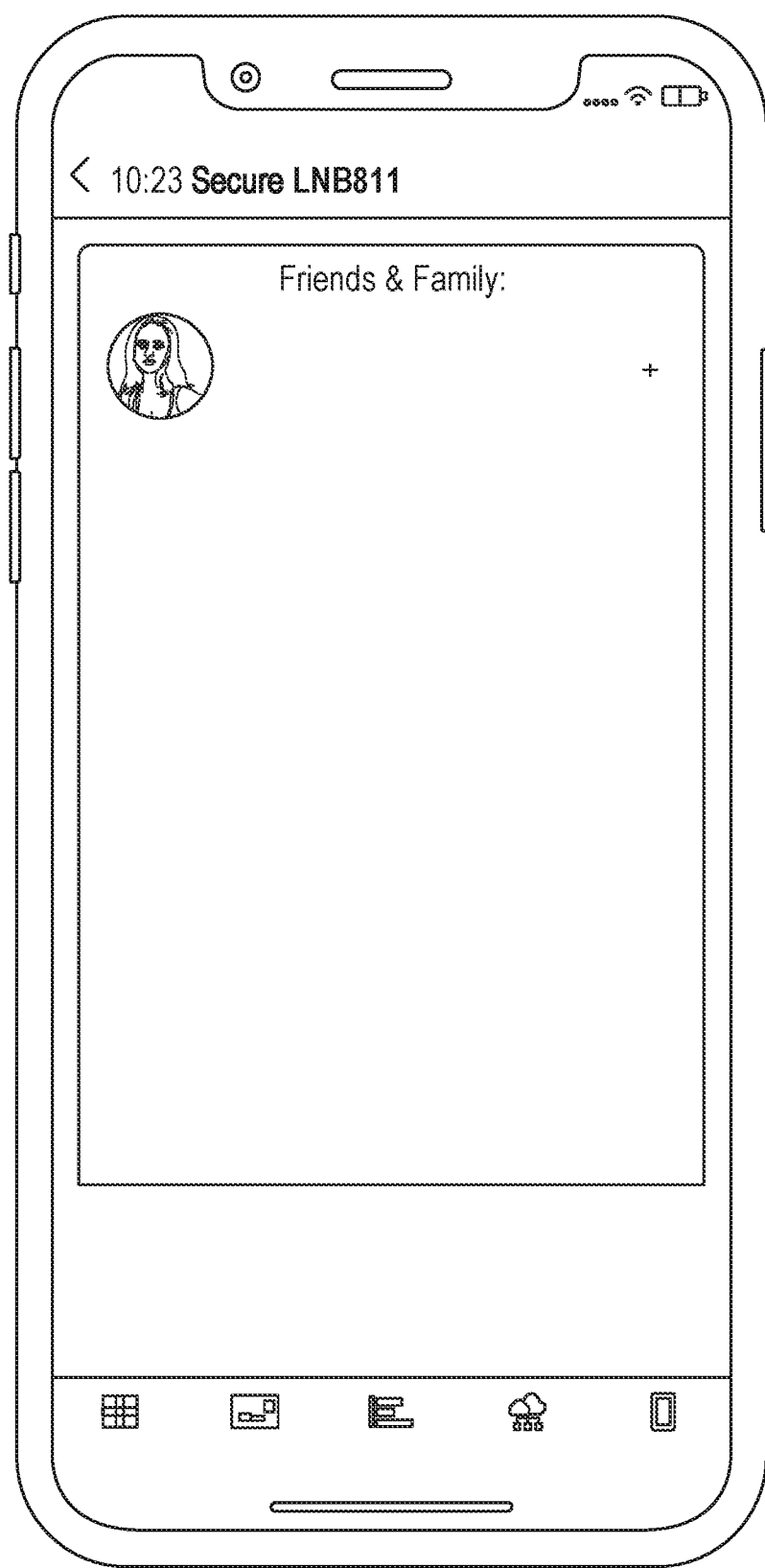

More specifically, the example of FIG. 18 further includes an "add" button on the bottom, as well as an additional "cancel" button on the bottom of the graphical user interface. Accordingly, after previously selecting one or more of the granted access rights listed above (e.g., "live view video"), the user may subsequently toggle the "add" button to grant this specific access right to a corresponding selected contact, thereby triggering the display of a graphical user interface corresponding to FIG. 19. In particular, the example graphical user interface of FIG. 19 parallels the example graphical user interface of FIG. 16, except that the example of FIG. 16 was empty, whereas the example of FIG. 19 now includes an instance of the small profile picture for the contact to whom an access right was delegated, thereby indicating that the specific contact has received the delegation of at least one access right, as further discussed above. Furthermore, in the example of FIG. 19, the user may optionally hover a mouse cursor or other input indicator over the small profile picture for the contact, thereby triggering the display of an identifier of the specific type of access right (or multiple rights) that was delegated to this contact (e.g., "live view video").

Figure 20:
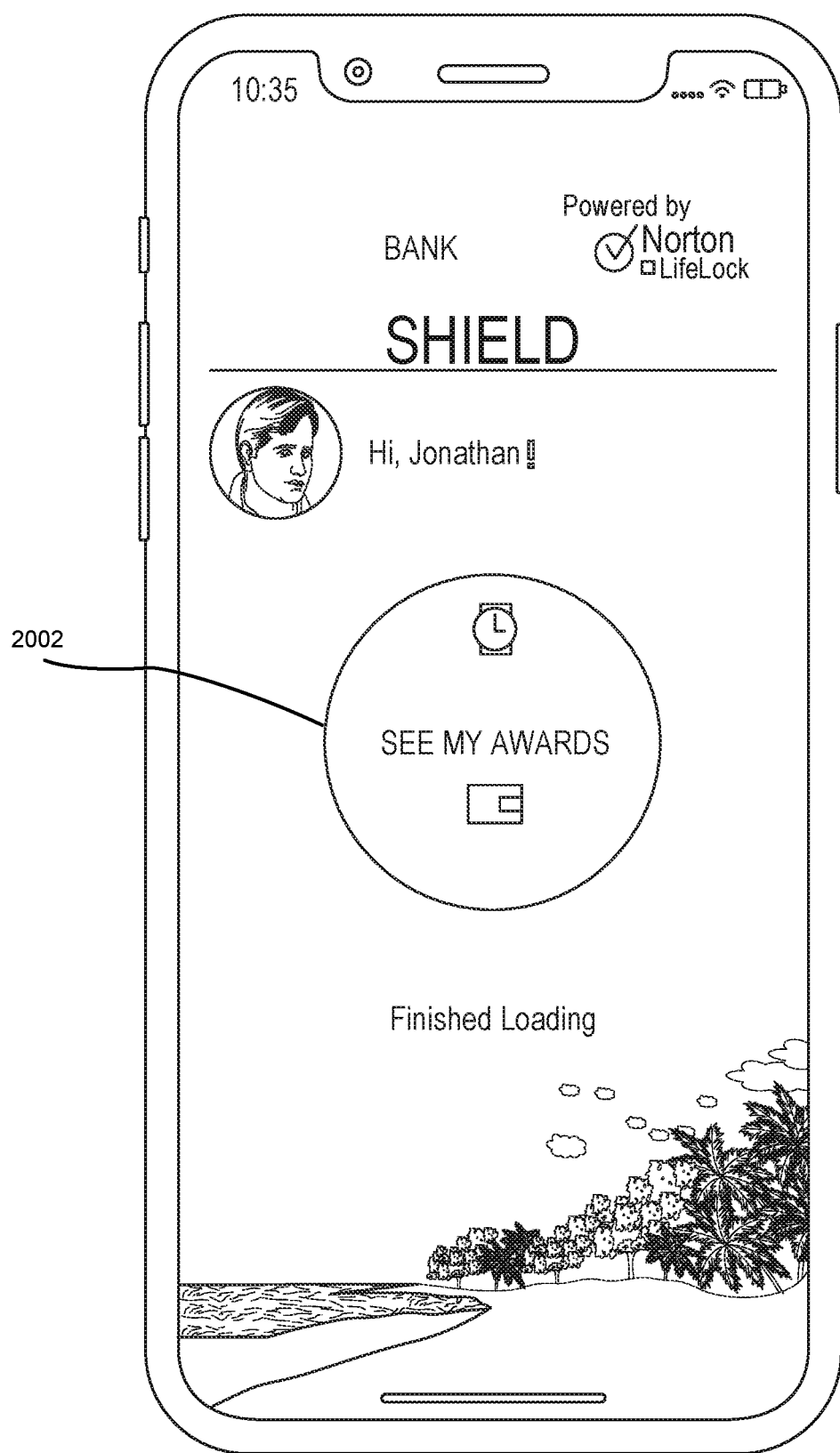

FIG. 20 shows an example of a graphical user interface corresponding to the child computing device of the embodiment 5, as discussed in more detail above. Accordingly, FIG. 20 shows a home screen of a client-side application that may be executing on the child computing device, and which may be coordinating with a parental control system. As further shown in this figure, the graphical user interface may display to the child a "SEE MY AWARDS" button 2002. In some examples, this particular button may be displayed in a manner that is quite prominent and conspicuous, thereby further encouraging the child to toggle the button. Moreover, toggling the button may also activate or trigger the execution of one or more security and/or parental control policies, in accordance with embodiments 5-6, and as discussed in more detail above. Furthermore, the corresponding graphical user interface may effectively request or require the user to select button 2002 in order to access or otherwise receive one or more rewards, thereby strongly incentivizing the user to more consistently and continuously toggle the security services that are invisibly triggered by selection of button 2002, in accordance with embodiment 6.

Figure 21:
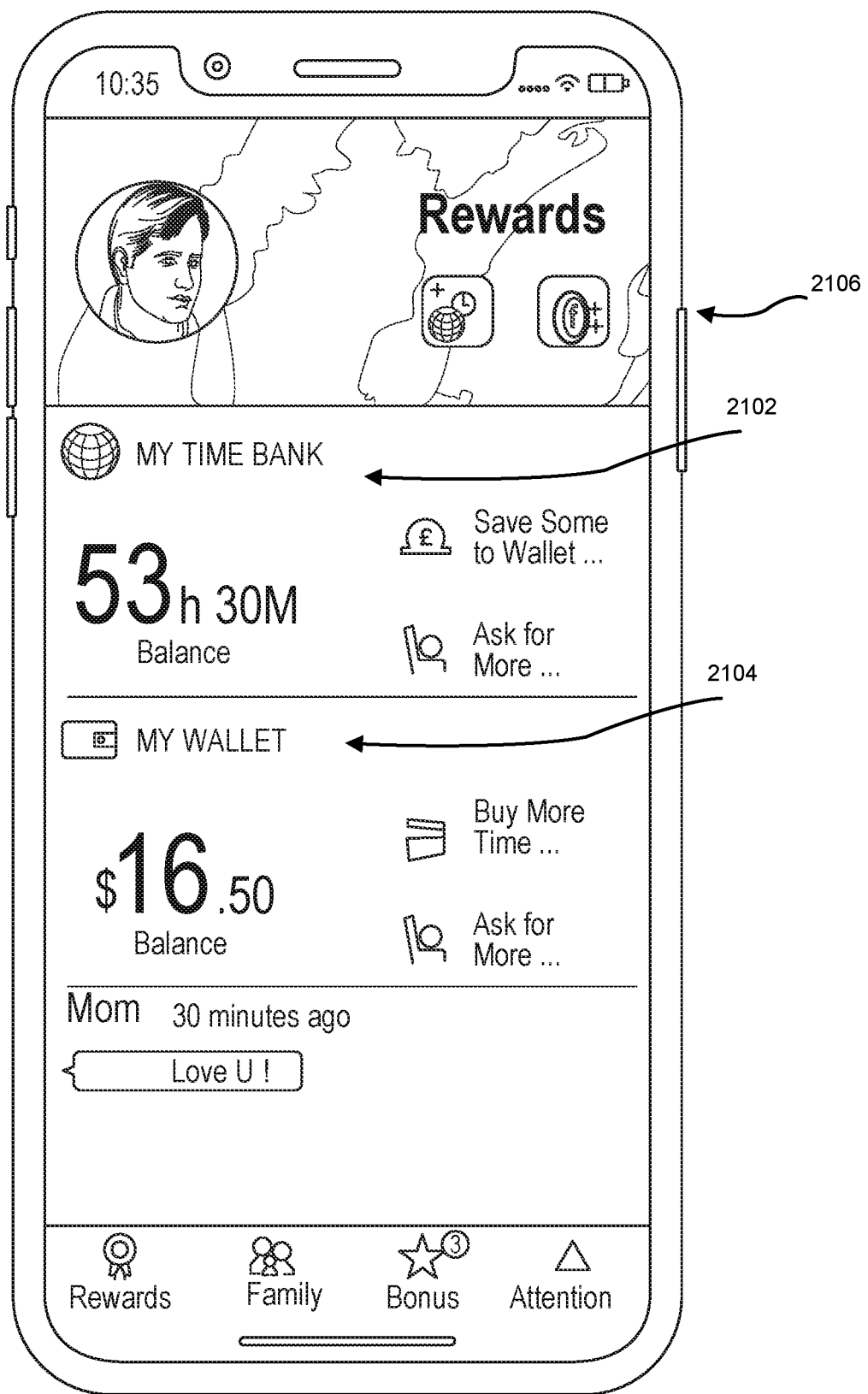

FIG. 21 shows another example graphical user interface at the child computing device. In particular, FIG. 21 shows an example of the graphical user interface after the child has navigated away from the home screen of FIG. 20 by selecting the "SEE MY AWARDS" button, as discussed above. The graphical user interface of FIG. 21 further displays a number of items of information for the child. For example, the graphical user interface displays "my time bank" icon 2102 and "my wallet" icon 2104, which may correspond to an allotment of network connectivity time (e.g., home network or Internet connectivity time) that the child may collect as an award and money as financial rewards that the child may also collect, respectively. At the top right portion of the graphical user interface, there is further shown a set 2106 of two graphical buttons, the button on the left may include a display of a clock, corresponding to a button to collect a reward of Internet connectivity time, and the button on the right may optionally display a coin, corresponding to a button to collect a financial reward. The graphical user interface of FIG. 21 may also specify, on the left-hand column, the specific amount of network connectivity time that the child has already collected. Similarly, the graphical user interface of FIG. 21 may also specify, on the left-hand column, the specific amount of financial reward, or money, that the child has already collected. Furthermore, FIG. 21 also shows how the graphical user interface may display buttons with textual prompts enabling the child to save some of the financial reward money to a wallet of the child, to ask for more financial rewards from one or more guardians of the child, to purchase more Internet or network connectivity time, and/or to ask for more Internet/network connectivity time or ask for more financial rewards from the guardian.

Figure 22:
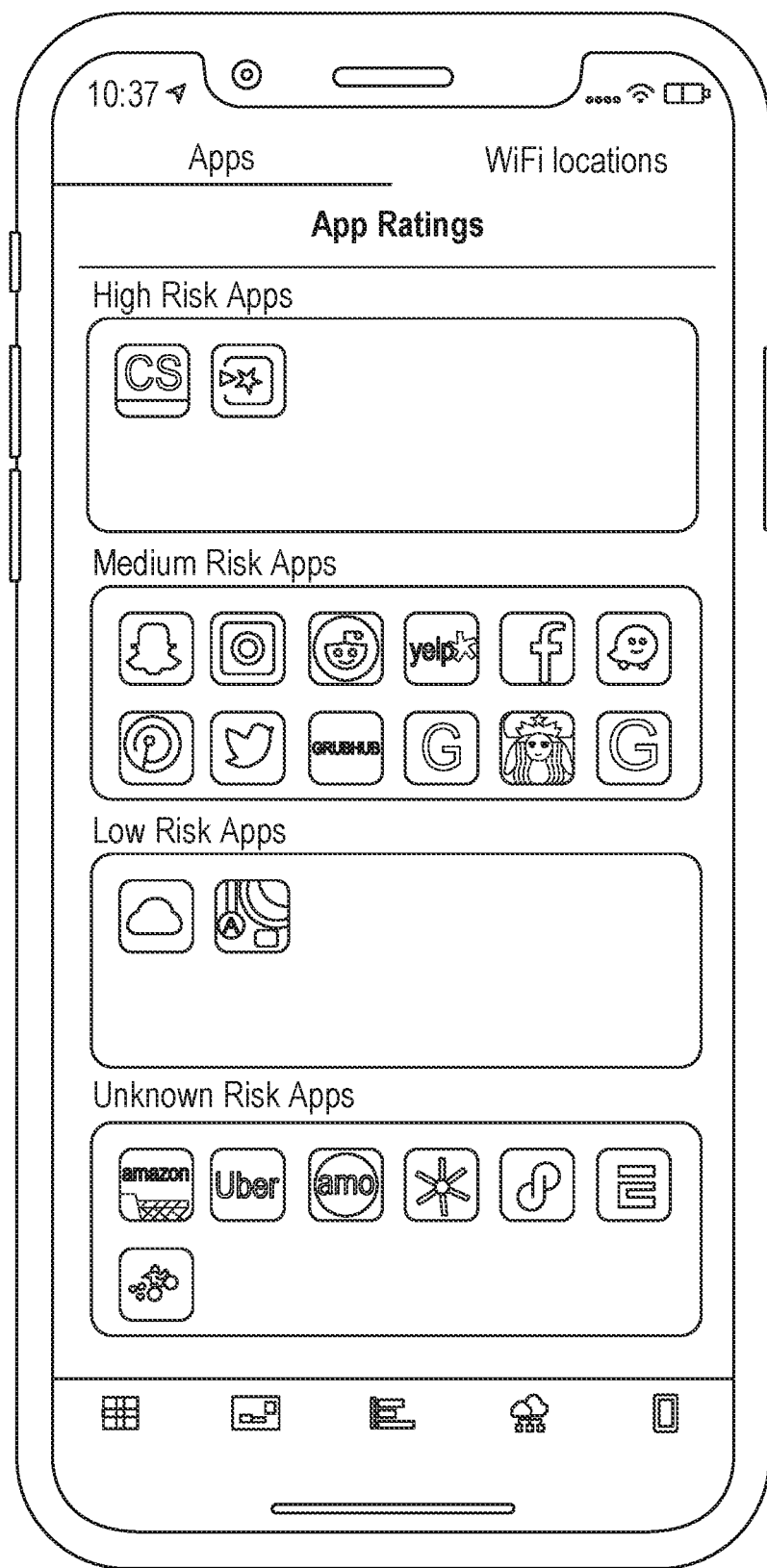

FIG. 22 shows another example graphical user interface, which may be displayed to the user after the user selects the "my phone" button or element from the home screen shown in FIG. 7. The embodiment of FIG. 22 may correspond to embodiment 4 of FIG. 1, as described in more detail above. The graphical user interface of FIG. 22 shows how a user may be presented, through a client-side security-centric mobile application in coordination with the cloud-based proxy security service of APPLICATIONS 1-3, with a comprehensive review of security-related information detected, by the proxy security service, from network traffic originating from the user's client device. The graphical user interface of FIG. 22 may further specify "App Ratings" at the top and, furthermore, may specify a list of applications, using application icons, within clusters corresponding to risk indicators. For example, the graphical user interface of FIG. 22 shows, at the top, a cluster of high risk mobile applications previously installed and/or executing on the user's device. Similarly, the graphical user interface of FIG. 22 shows, at the middle, a cluster of medium risk mobile applications. Furthermore, the graphical user interface of FIG. 22 shows, at the bottom, a cluster of low risk mobile applications. All of these applications may be detected, by the cloud-based proxy security service based on network traffic originating from the user's client device, and, in response, the proxy security service may provide the information regarding potential threat indicators back to the client device specifically through the security-centric mobile application locally installed on the client device.

Figure 23:
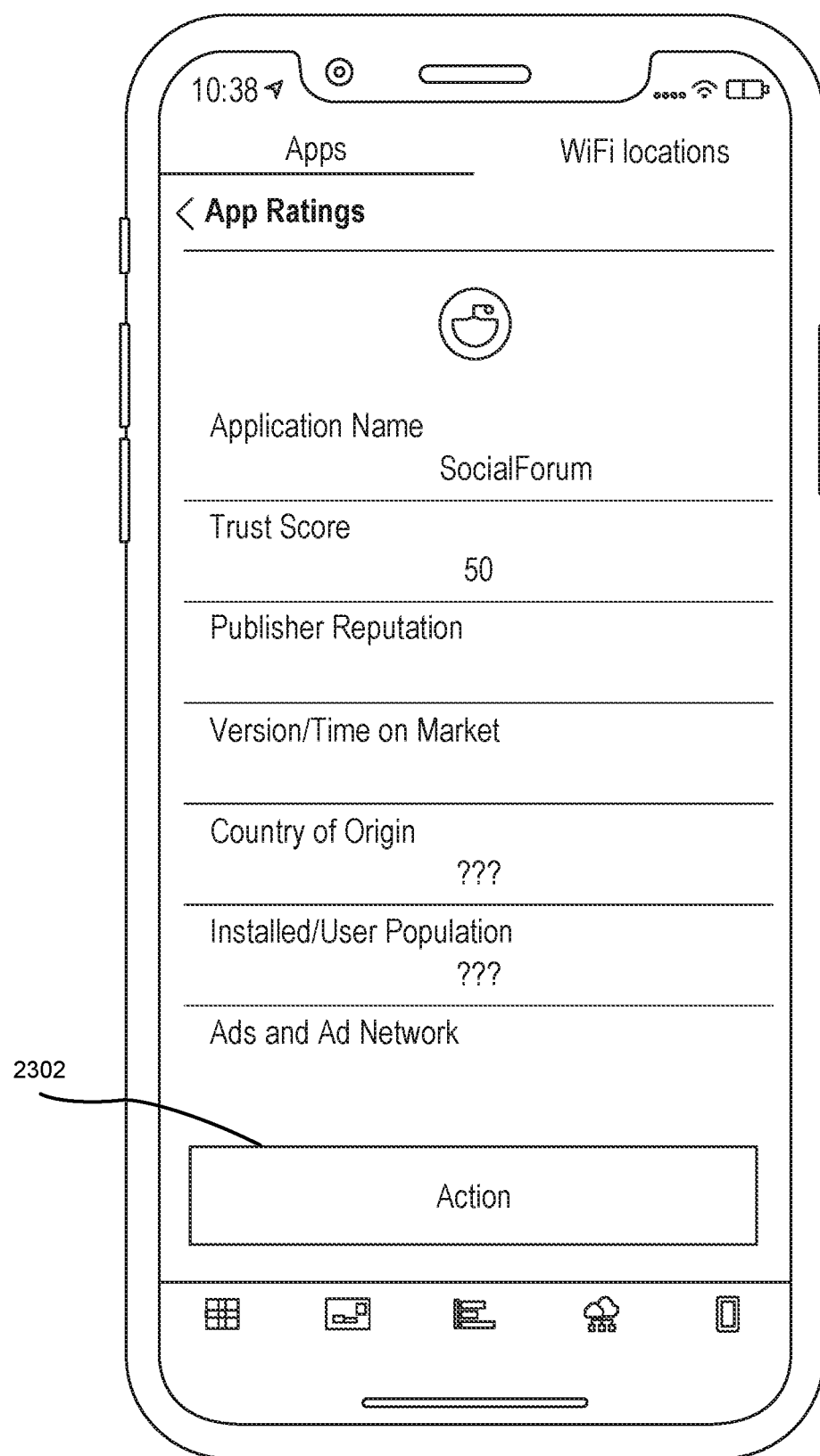

FIG. 23 shows an example graphical user interface corresponding to the user navigating to an information screen for a specific application, after selecting that specific application within the list of mobile application icons shown in FIG. 22, as discussed in more detail above. In particular, FIG. 23 shows how the graphical user interface may optionally display, to the user, helpful information regarding security concerns or issues in connection with the specific mobile application. These items of information may include the application name, a trust score (e.g., on a scale from 1 to 100), an indication of a publisher reputation, an indication of the version of the mobile application and/or an indication of the amount of time that the mobile application has been on the mobile application marketplace, a country of origin for the mobile application, an indication of the installed/user population, and/or an indication of an ad network associated with the mobile application.

FIG. 23 also shows how the graphical user interface may optionally display a "action" button 2302 on the bottom of the screen. Upon toggling button 2302, the graphical user interface may optionally display a subsequent screen to the user, as further shown in FIG. 24.

Figure 24:
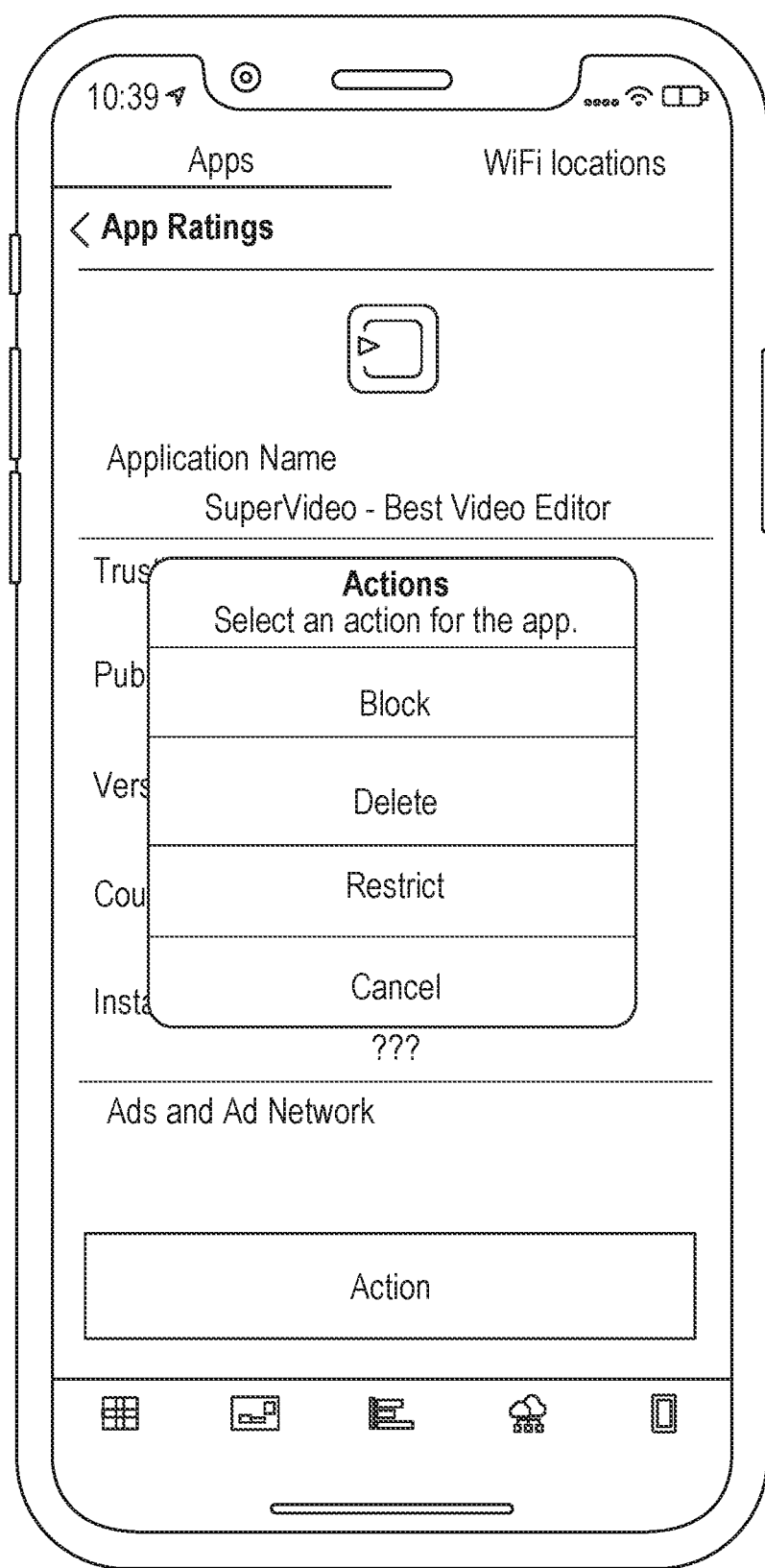

FIG. 24 shows an example of the graphical user interface after the user has selected the "action" button, discussed above in connection with FIG. 23. In particular, FIG. 24 shows how the graphical user interface may optionally display to the user a list of available actions that the user may perform in connection with the selected mobile application. As further illustrated in this figure, the list of applications may include options for blocking the mobile application, deleting the mobile application, restricting the mobile application along one or more dimensions, and/or canceling the initial indication to perform an action in connection with the mobile application.

Figure 25:
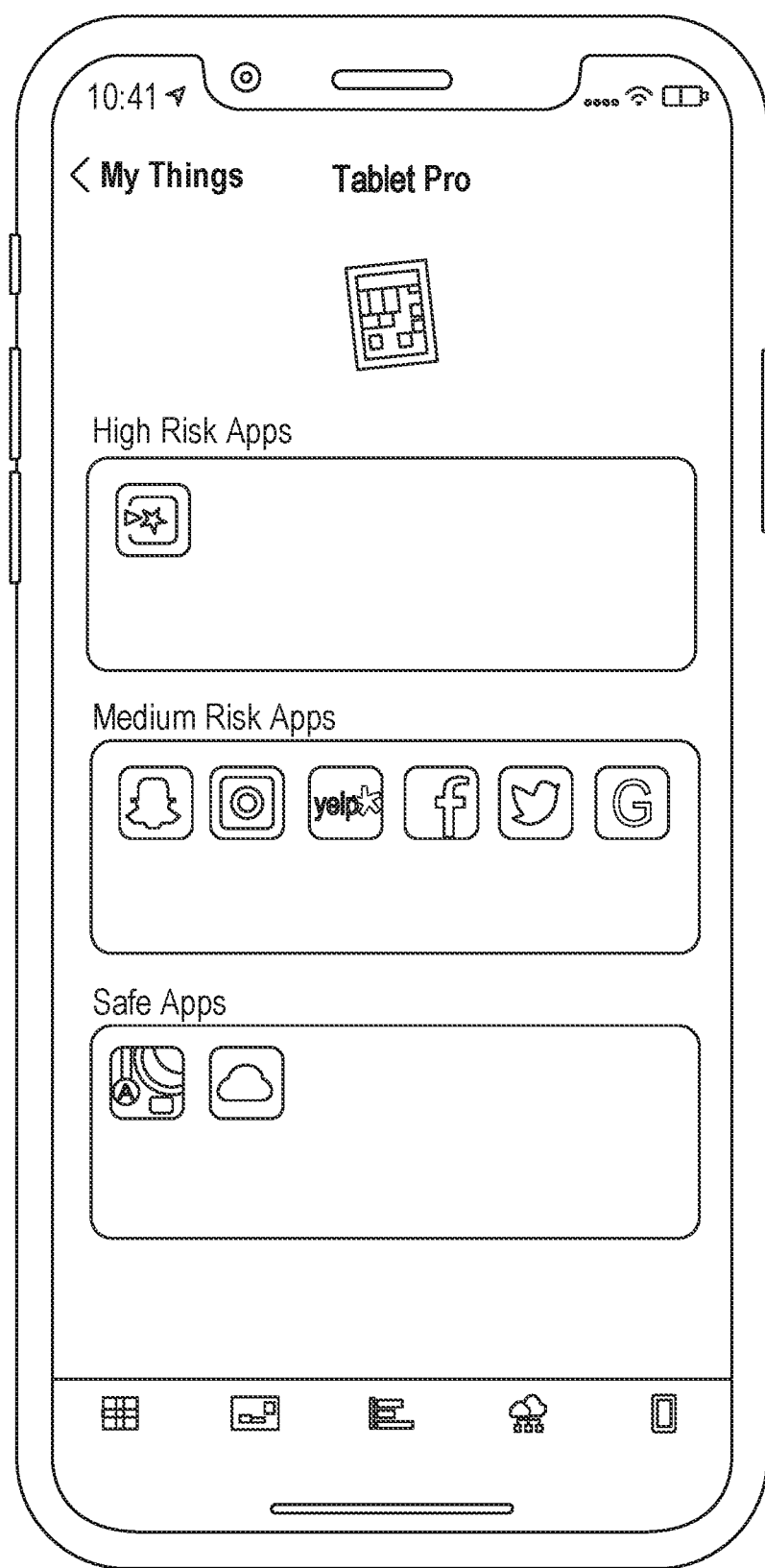

FIG. 25 shows another example of the graphical user interface. FIG. 25 parallels FIG. 22 in the sense that both of them list security information regarding mobile applications installed on one or more devices. Nevertheless, FIG. 25 differs from FIG. 22 in the sense that the user may navigate to FIG. 25 by selecting one or more of the devices listed within the "my things" button from the home screen of FIG. 7. For example, the user may optionally select the tablet from the list of devices shown in FIG. 14, thereby triggering the display of the security information further shown in FIG. 25. In contrast, the administrator or guardian mobile device through which this individual manages a remainder of devices on the home network may access policies corresponding to this primary device through the "my phone" button within the home screen of FIG. 7. In other words, the "my phone" button may trigger the display of information regarding the primary administrator or guardian device for managing the overall home network, whereas the "my things" button may trigger the display of options for managing the Internet-of-Things and/or secondary mobile devices or other computing devices on the same local area network.

Returning to the example of FIGS. 22 and 25, the graphical user interface displaying the security-centric information regarding installed and/or executing mobile applications may further be updated in real time. For example, the user may optionally swipe a cursor or other indicator to thereby trigger a refreshing or updating of the information displayed within these graphical user interface screens. Upon completing one or more refresh operations, the graphical user interface may insert, delete, and/or relocate one or more icons for the mobile applications, thereby indicating that one or more of these applications was previously installed, uninstalled, and/or further indicating that one or more of these applications was switched in terms of its threat indicators status (e.g., switched from high to low risk, etc.).

Figure 26:

Returning to the parental control system previously discussed in connection with FIGS. 20-21, FIG. 26 shows an example graphical user interface that the child computing device may display to a child to enable the child to accumulate more rewards, either in terms of financial rewards and/or network connectivity time rewards, as further discussed above. In particular, FIG. 26 may show a list of available instructional videos, lessons, and/or seminars, from which the child may select to complete in order to be compensated in terms of financial rewards and/or network connectivity time rewards. In the specific example of FIG. 26, the top of the graphical user interface may display to the child an option for completing a "Password Safety" instructional lesson or seminar, which may further result in compensating the child with "30 minutes" of network connectivity time, as further displayed within this graphical user interface. Below this option for the "Password Safety" seminar, there is another graphical indication for a "Online Shopping Safety" seminar, which, when completed, may further provide the child with an additional or alternative reward in terms of money or network connectivity time. In some examples, one or more of these lessons may correspond to a "bonus round" that the child may complete after previously depleting financial savings and/or Internet connectivity allotments, thereby enabling the child to continue with online purchases and/or Internet connectivity sessions.

Figure 27:
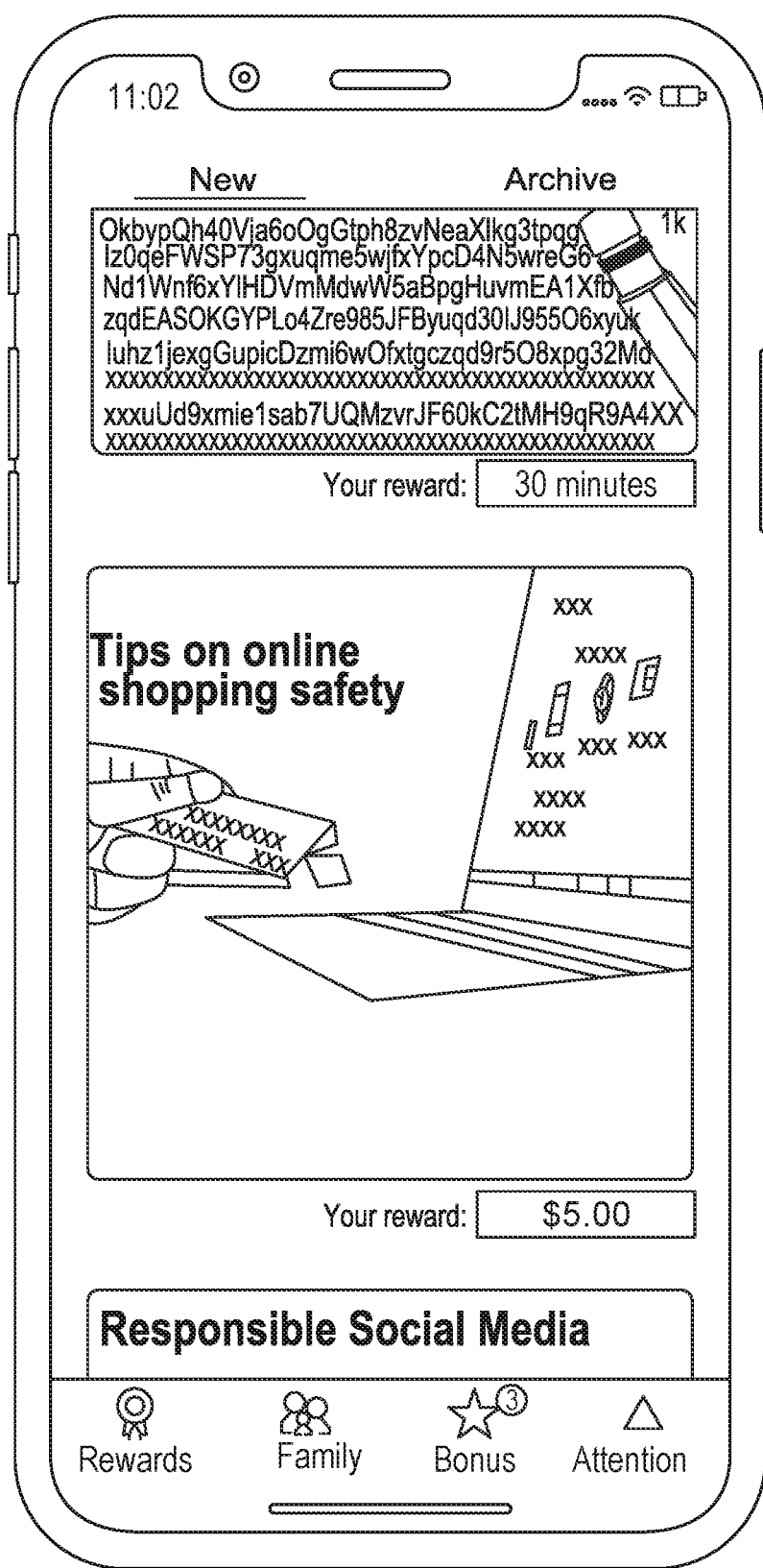

FIG. 27 shows another example of the graphical user interface of FIG. 26, after the user has previously scrolled down slightly from the position of FIG. 26. Scrolling down from the position of FIG. 26 has enabled the graphical user interface to reveal more information regarding the "Online Shopping Safety" seminar. More specifically, the graphical user interface now further specifies to the child that completion of this particular seminar will result in rewarding the child with a financial award of "$5.00." Furthermore, the graphical user interface also further displays, at the bottom of the screen, the title of a subsequent seminar/procedure, with the title beginning "Responsible Social Media." The child may also optionally, or alternatively, select and complete this additional seminar/procedure to obtain a corresponding reward, in a manner that parallels the rewards for the seminar/procedures that are further discussed above in connection with FIGS. 26-27.

Figure 28:
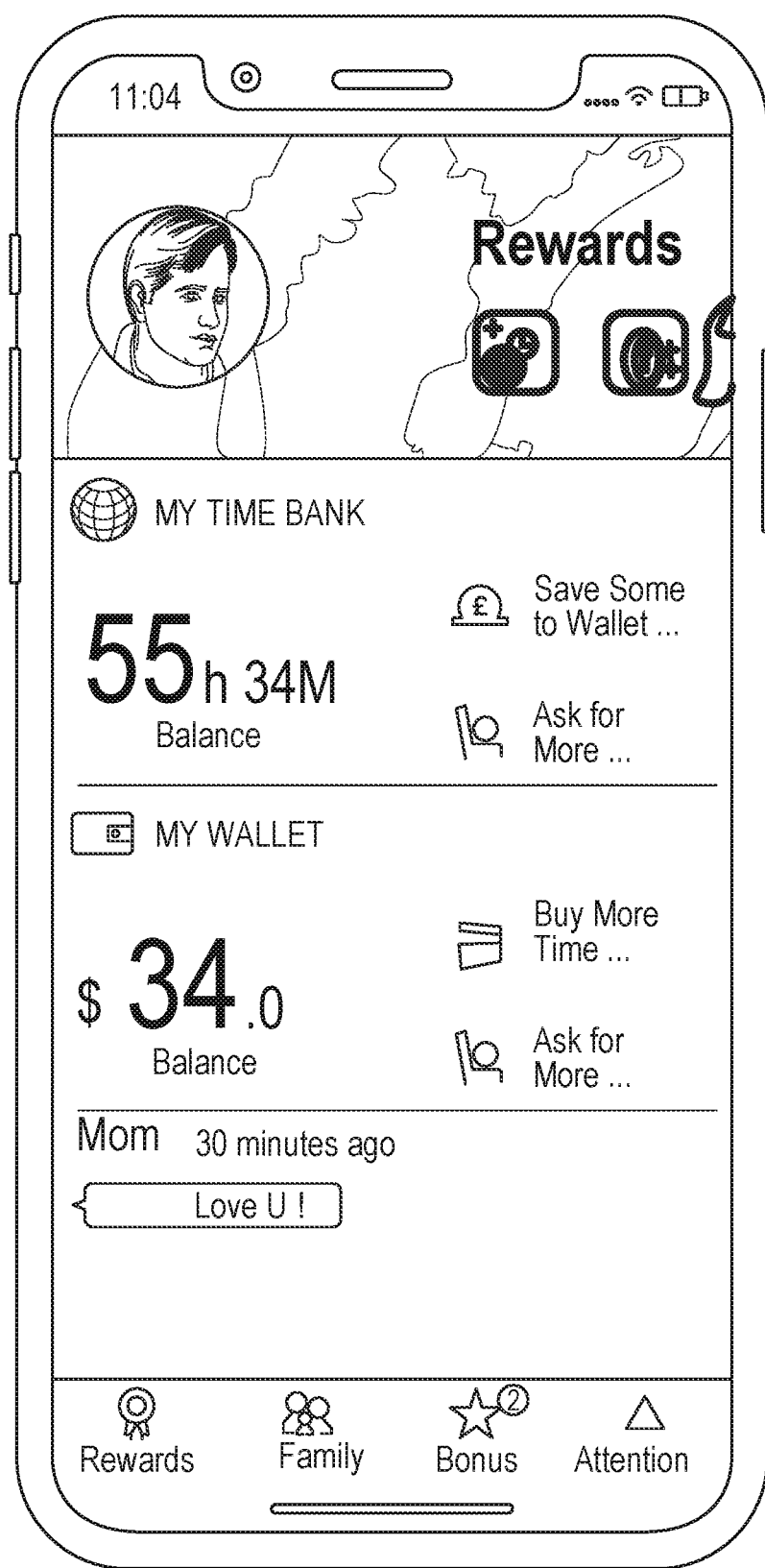

FIG. 28 shows another example of the graphical user interface of FIG. 21. The example of FIG. 28 differs from the example of FIG. 21, however, because in the example of FIG. 21, the "collect" rewards buttons, on the top right, are highlighted, thereby further indicating to the child that the child may select either or both of these buttons to thereby collect rewards, in terms of money or network connectivity time, that the child previously earned and that are now therefore available to him or her. In contrast, in the example of FIG. 28, the child has already clicked both of these collect rewards buttons on the top right, thereby darkening these buttons (e.g., the darkening indicates to the child that there is nothing further available for the child to collect for now). Moreover, the particular amounts of money and/or connectivity time available to the child, as specified on the left-hand side of the screen (i.e., "55 h 34 m" and "$34.0" on the left-hand side of the screen in FIG. 28) show modified, and increased, amounts, in comparison to the value shown in FIG. 21. For example, the value of available Internet connectivity time of "53 h 30 m" in FIG. 21 has increased to "55 h 34 m" in FIG. 28, after the child clicked, on the left, the clock-based "collect" icon or button on the top right of the screen. The specification of money available to the child has also increased, in a parallel manner, after the user clicked, on the right, the coin-based or money-based "collect" icon or button on the top right of the screen. In some examples, the graphical user interface may display real-time animation of these values increasing in response to the user toggling the corresponding collect icon or button.

Figure 29:
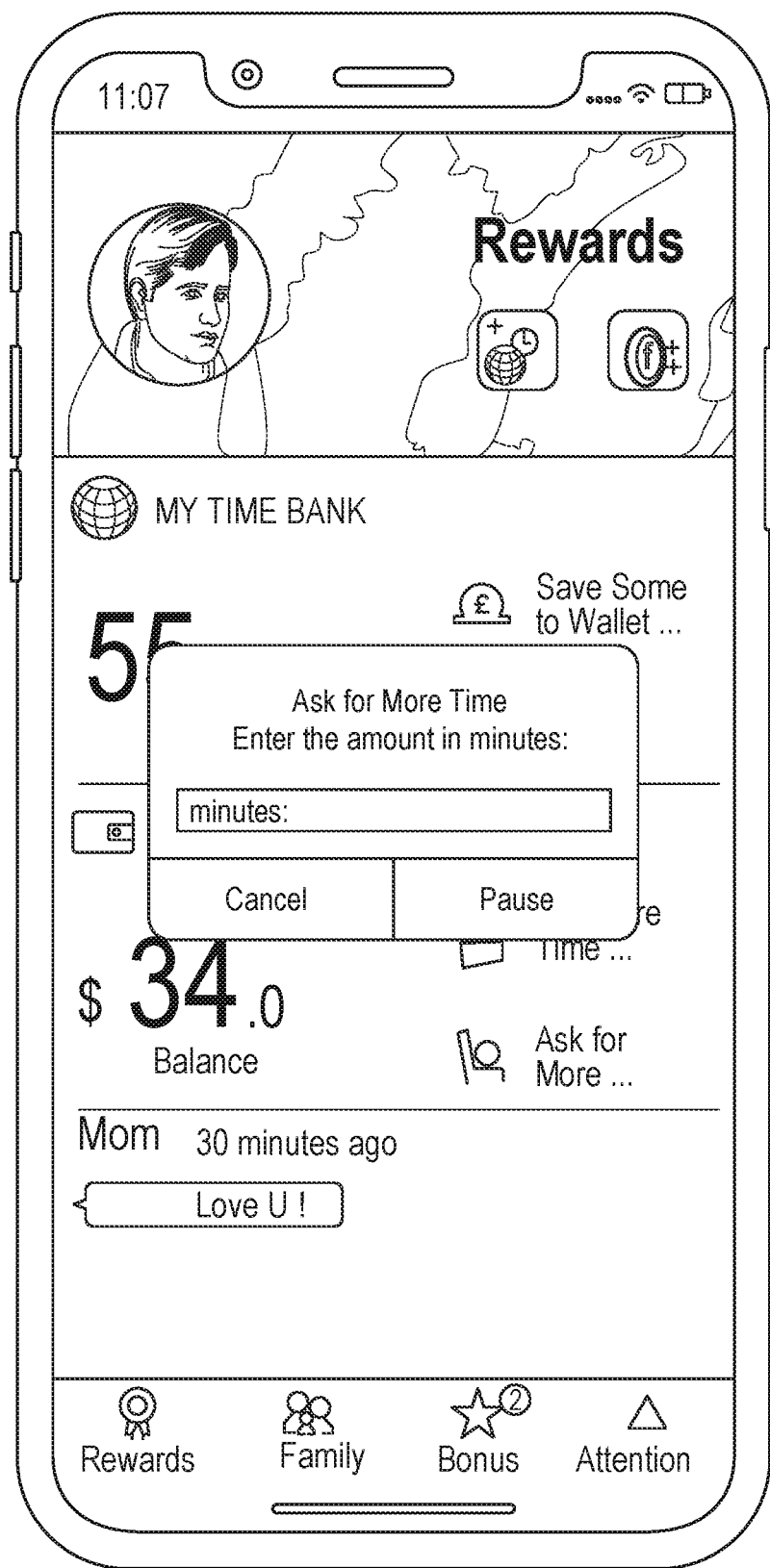

FIG. 29 shows an example graphical user interface after the child has previously selected the "ask for more" button previously shown in the parental control system screen of FIG. 21. Accordingly, the graphical user interface of FIG. 29 further displays to the child a pop-up message prompting the user to "Ask for More Time." The pop-up message may also optionally display to the child an indication to "Enter the amount in minutes." Furthermore, the pop-up message may also optionally display a "Cancel" button as well as a "Pause" button. Accordingly, FIG. 29 illustrates how the child may optionally specify a particular amount, in terms of minutes, to request from a guardian or parent in terms of network connectivity time.

Figure 30:
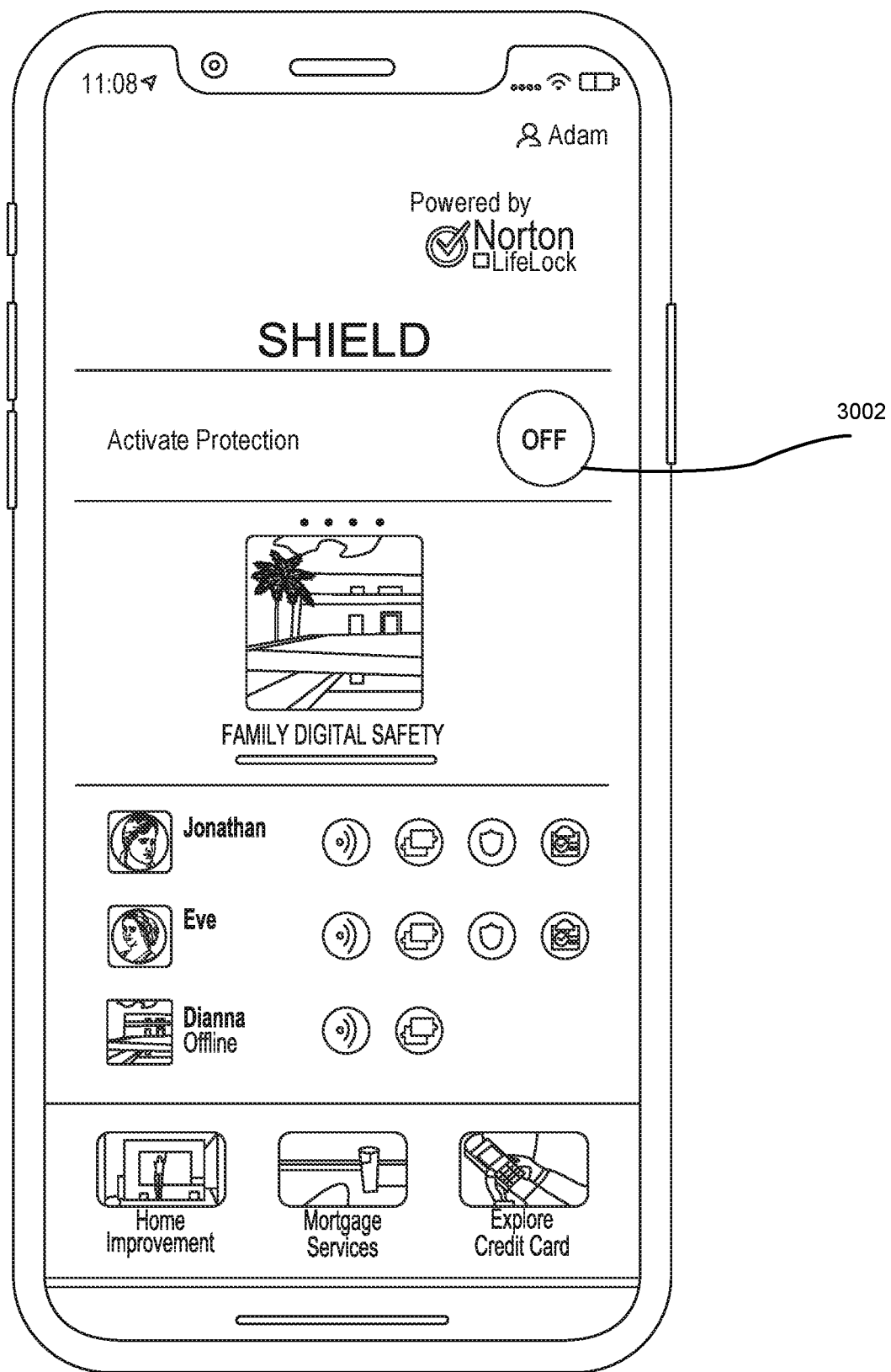

FIG. 30 displays another graphical user interface that may correspond to a distinct application, for the guardian of the child, which enables the guardian to coordinate with the parental control system discussed above. In other words, whereas FIGS. 20-21 show the application for the child computing device interacting with a parental control system, FIG. 30 shows an optional home screen for a distinct application for the guardian of this specific child. The illustration of FIG. 30 also further shows how the graphical user interface may include a button 3002 to "activate protection," in a manner parallel to the home screen of FIG. 20 (e.g., the "SEE MY AWARDS" button of FIG. 20 further triggers the activation protection from the perspective of the child). The graphical user interface of FIG. 30 also displays a list of children protected under the guardian by the corresponding parental control system, including the list of "Jonathan," "Eva," and "Diana." On the right-hand side of each of the icons for each of these children protected by the parental control system, there is further shown a horizontal sequence of icons, thereby enabling the guardian to select one or more of these icons to perform one or more corresponding security actions through the parental control system.

More specifically, immediately adjacent, on the right, of each of the listed names of the protected children is an icon for a vocal wave, thereby corresponding to direct communication with the child using the mobile device, i.e., in-app voice communication. Similarly, adjacent to the phone call icon is another icon for text messaging, thereby further enabling the guardian to communicate with the child using text message, i.e., in-app text messaging system. Furthermore, adjacent on the right to the text messaging icon is a shield icon that further indicates more comprehensive parental control functionalities available to the guardian.

Figure 31:
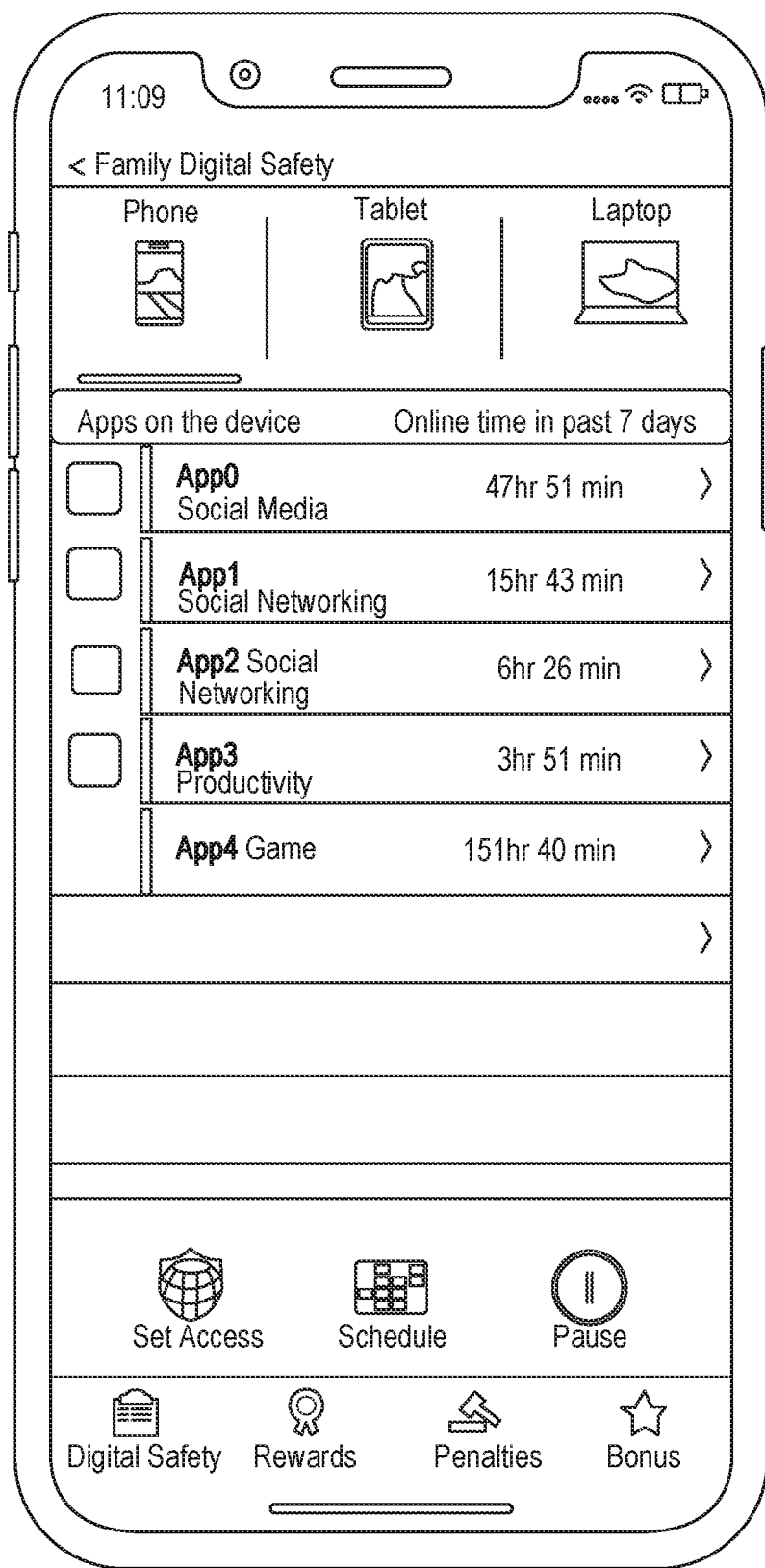

FIG. 31 shows an example graphical user interface that may be displayed to the guardian after the guardian has toggled the shield icon for the parental control functionalities, discussed above in connection with FIG. 30. FIG. 31 may correspond to mobile application management through a cloud-based proxy security server, in accordance with embodiment 4, as discussed in more detail above (which, of course, may also be performed in combination with, or overlapping with, the parental control system embodiment of embodiment 5).

As further shown in FIG. 31, the client-side application available to the guardian, in coordination with the parental control system, may display to the guardian a list of applications residing, installed, and/or executing on the child computing device, with the specific child computing device as selected from the list of available children shown in FIG. 30. On the left-hand column, the graphical user interface displays this list of applications, whereas on the right-hand column, the graphical user interface optionally displays an indication of "time online" over a period of time, such as the "past 7 days." Additionally, FIG. 31 also displays to the guardian a horizontal sequence, at the top, of the devices corresponding to the specific child selected from the screen shown in FIG. 30. For example, this particular selected child may possess a "Phone," "Tablet," and "Laptop," as listed on the top of the graphical user interface shown in FIG. 31. Accordingly, the guardian viewing the graphical user interface of FIG. 31 may optionally select any one of these child computing devices. Upon selecting a specific child computing device from this list, the list of residing/executing mobile applications shown below and within the graphical user interface may be refreshed and updated, thereby indicating that different sets of mobile applications are installed on different devices possessed by the child. For example, the guardian may select the "Phone," and thereby see an updated list of mobile applications executing on the phone, and corresponding indications of time online for those applications, whereas the guardian may also select the "Laptop," and thereby see an updated list of mobile applications executing on the laptop, etc.

Figure 32:
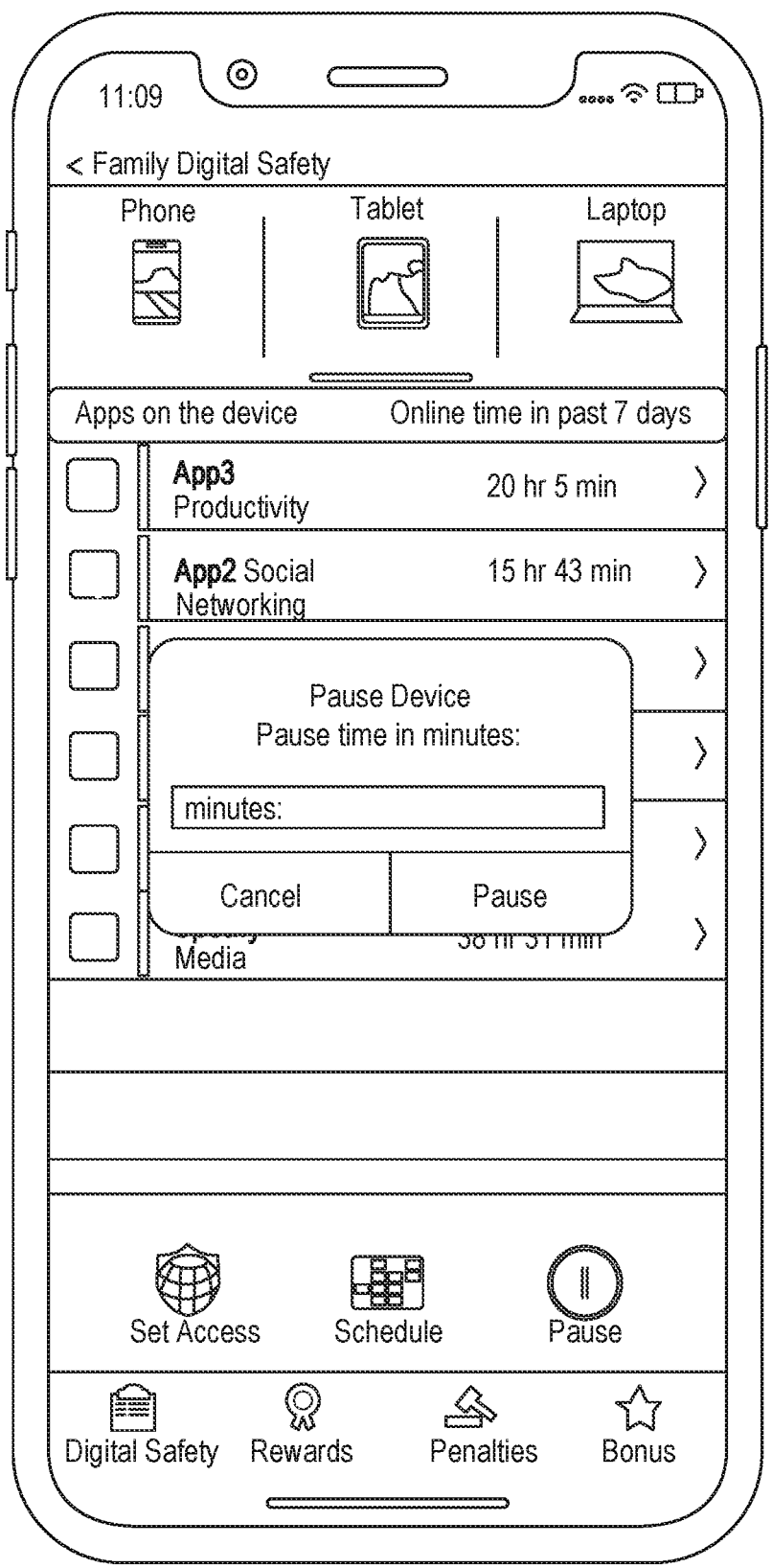

FIG. 31 also shows a "pause" button on the bottom right-hand side of the graphical user interface. The guardian may optionally toggle this "pause" button to thereby pause, or essentially freeze, the specific child computing device that the guardian had selected using the graphical user interface of FIG. 31, as discussed above. FIG. 32 shows a pop-up notification that may be displayed to the guardian in response to selecting the "pause" button. In particular, the pop-up notification may request for the guardian to specify a particular amount, in minutes, for which the particular selected child computing device will be paused or frozen. The guardian may optionally select to perform this pausing functionality in response to viewing the list of available mobile applications residing, or executing, on that particular child computing device. For example, the guardian may determine that these mobile applications represent a parental control risk, and/or a security risk, and thereby motivate the guardian to pause the corresponding child computing device while the guardian takes other remedial actions, such as attempting to delete or uninstall one or more of these inappropriate applications.

Figure 33:
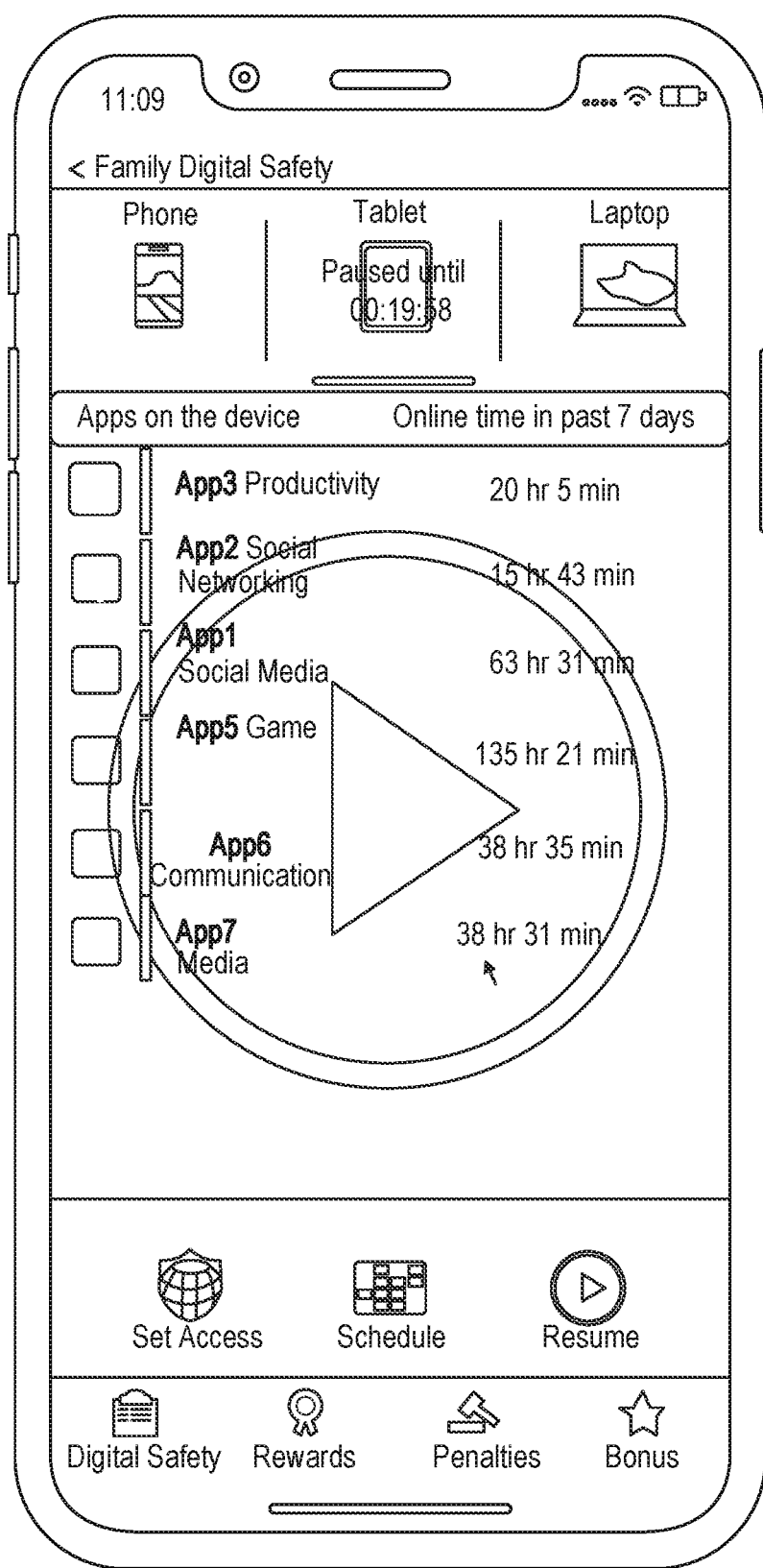

FIG. 33 shows another example graphical user interface, which may be displayed to the guardian after the user has successfully paused the child computing device in accordance with the discussion of FIGS. 31-32 above. Accordingly, the background screen may be "grayed out," and a pause/play indicator may be displayed, in a large fashion, over the screen of the guardian application displayed to the guardian. The pausing functionality of this embodiment may be performed through the cloud-based proxy security service by "black-holing" network traffic originating from the selected child computing device, thereby preventing any of this network traffic from successfully reaching its intended destinations on the larger wide area network, such as the Internet, and thereby further pausing or freezing the child computing device, at least in terms of its interactivity with the network.

Figure 34:
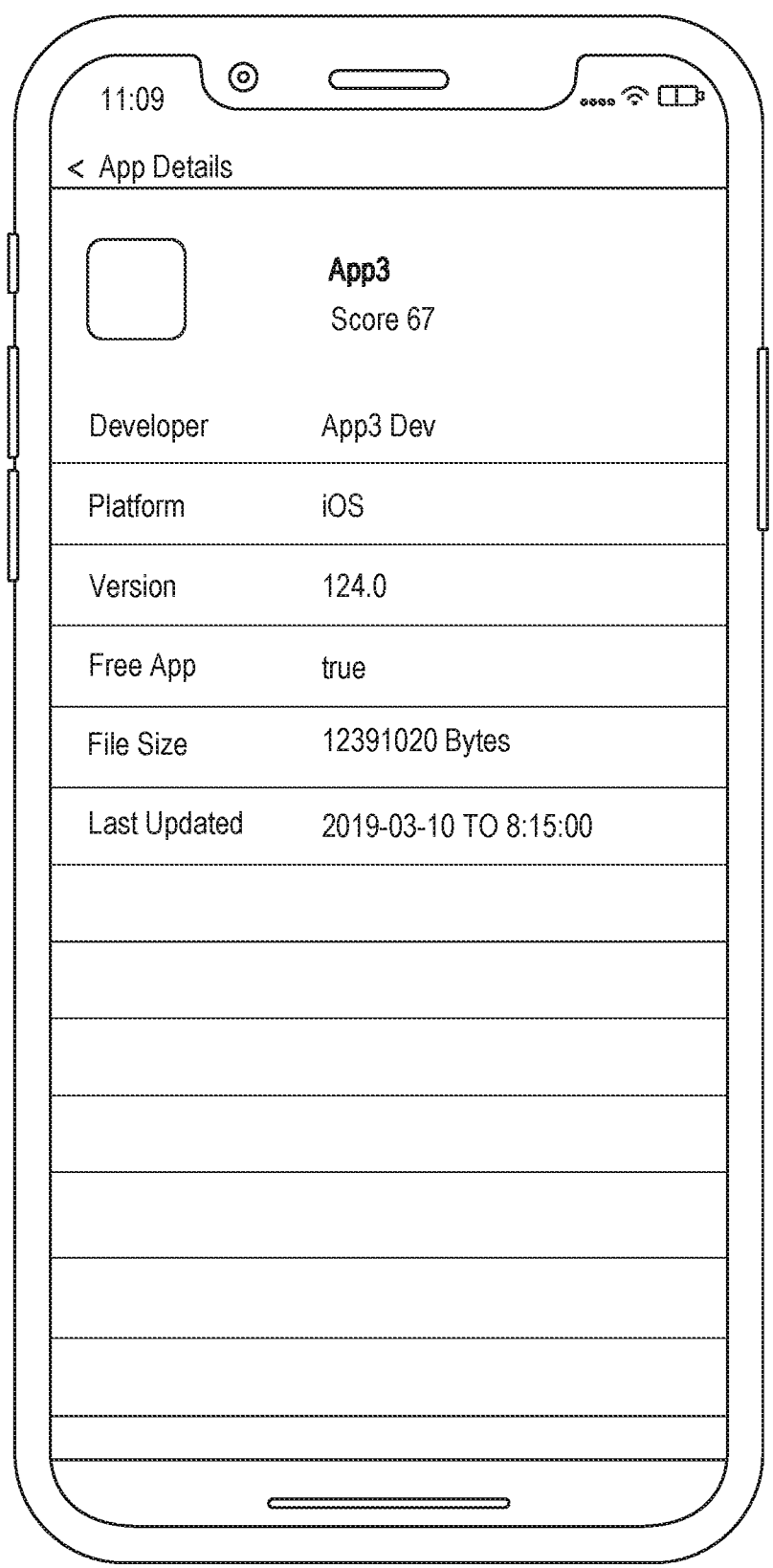

FIG. 34 shows another example of a graphical user interface that may be displayed to the guardian. In particular, FIG. 34 shows an example of the graphical user interface that may be displayed to the guardian in response to the guardian selecting a specific one of the mobile applications that are listed within the graphical user interface of FIG. 31. Accordingly, the example of FIG. 34 shows how the graphical user interface may display to the guardian additional or supplementary security-centric information regarding the particular selected mobile application. These items of information may include an identifier of the developer of the mobile application, identifier of the platform or operating system on which the mobile application executes, an indication of the version of the mobile application, an indication of whether the mobile application is free or commercialized, an indication of the file size of the mobile application, and/or an indication of the specific timing of the last time that the mobile application was updated, as further shown in the specifics of FIG. 34.

Figure 35:
Figure 36:

FIG. 35 shows another example graphical user interface, from the perspective of the guardian, in terms of instructional lessons or seminars that are available to provide to a child protected by the parental control system, thereby enabling the child to complete these lessons or seminars and thereby achieve one or more awards, as discussed above. In particular, FIG. 35 shows how the graphical user interface may display to the guardian additional metadata or prose describing the particulars of the lesson or seminar. The graphical user interface may specify to the guardian that the guardian may purchase this particular lesson or seminar, thereby making this particular lesson or seminar available for the guardian to provide to the child, which further provides an opportunity for the child to complete the lesson and receive the award. Moreover, the graphical user interface may also specify to the guardian the particular price that the guardian may be required to pay in order to unlock this functionality, as further discussed above (i.e., "$1.99" in the illustrative example of FIG. 35). For completeness, FIG. 36 also shows a subsequent graphical user interface screen through which the guardian may navigate to complete the process of purchasing a particular lesson or seminar, as further discussed above.

Figure 37:

Additionally, FIG. 37 shows how the guardian may return to a lesson/seminar home screen, and the screen may further display, at the top, an indicator of "purchased" lessons/seminars. Accordingly, the guardian may optionally toggle this particular indicator, thereby triggering the display, within the graphical user interface, of a list of all of the lessons/seminars that the guardian has previously purchased in accordance with the examples of FIGS. 35-36, as discussed in more detail above.

Figure 38:
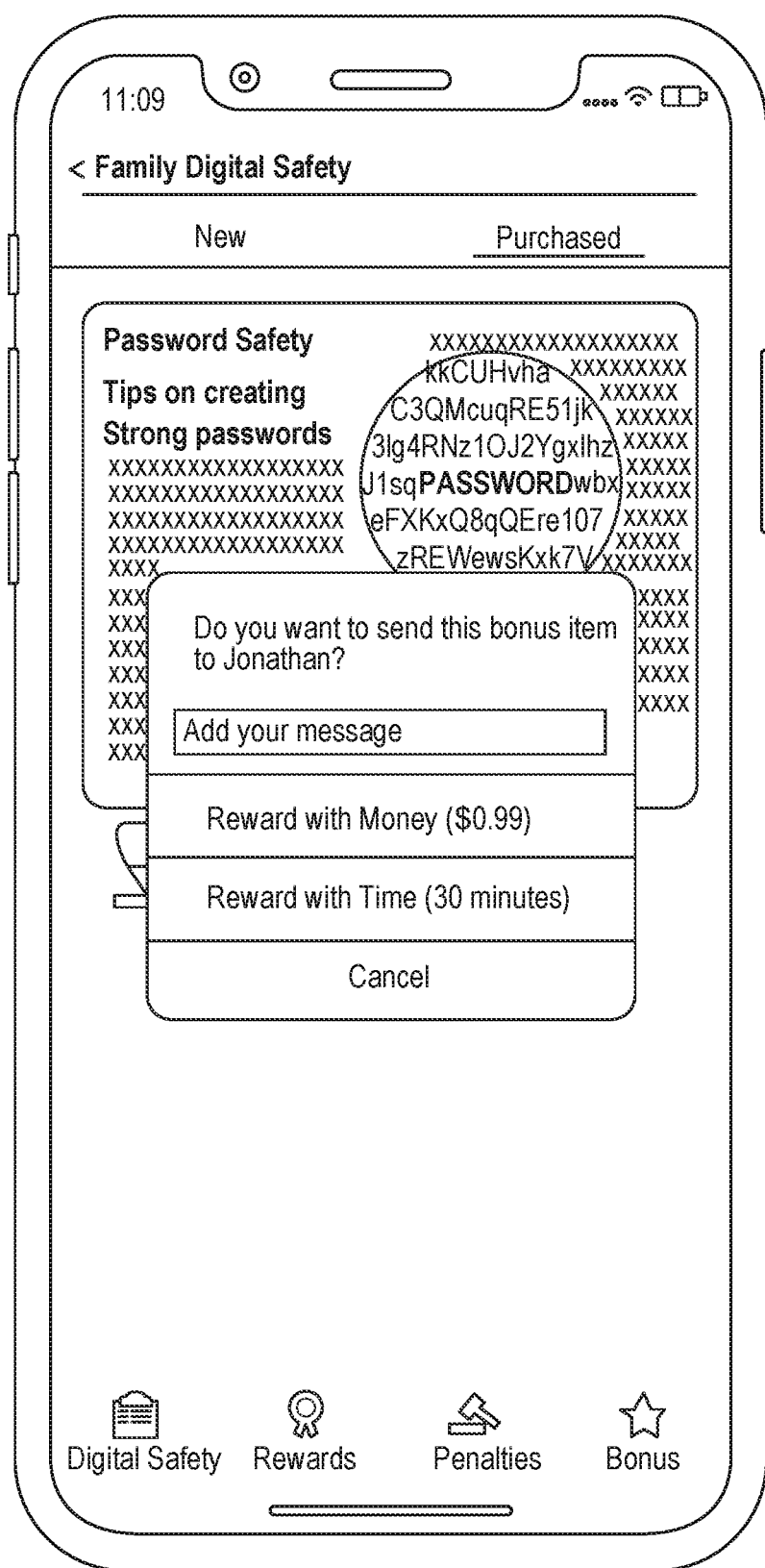

FIG. 38 shows another example graphical user interface that may be displayed to the guardian to enable the guardian, after the guardian has previously purchased one of the lessons, to provide that specified lesson to one or more of the children protected by the parental control system. For example, the particular graphical user interface may display, in a horizontal sequence, a list of user icons, each of which may correspond to one of the children protected by the parental control system. The guardian may optionally select one or more of these particular icons, thereby triggering the pop-up notification shown in FIG. 38. In the specific example of this figure, the graphical user interface may prompt the guardian by asking "Do you want to send this bonus item to Jonathan?" The pop-up notification may also provide two different options in terms of offering a reward to the child for completing this particular lesson. These two options may include "Reward with Money" (i.e., "$0.99") and "Reward with Time" ("30 minutes"). The guardian may optionally select one of these two different options to thereby provide the offer to the child, at which point the child will have the opportunity to complete the corresponding lesson and thereby receive the corresponding reward that was selected by the guardian in accordance with the graphical user interface of FIG. 38. Alternatively, in other examples, the child may have already completed the lesson shown in FIG. 38, and the pop-up notification of this figure may enable the guardian to finalize the process of releasing a corresponding reward to the child, after the child has already completed the lesson.

Figure 39:
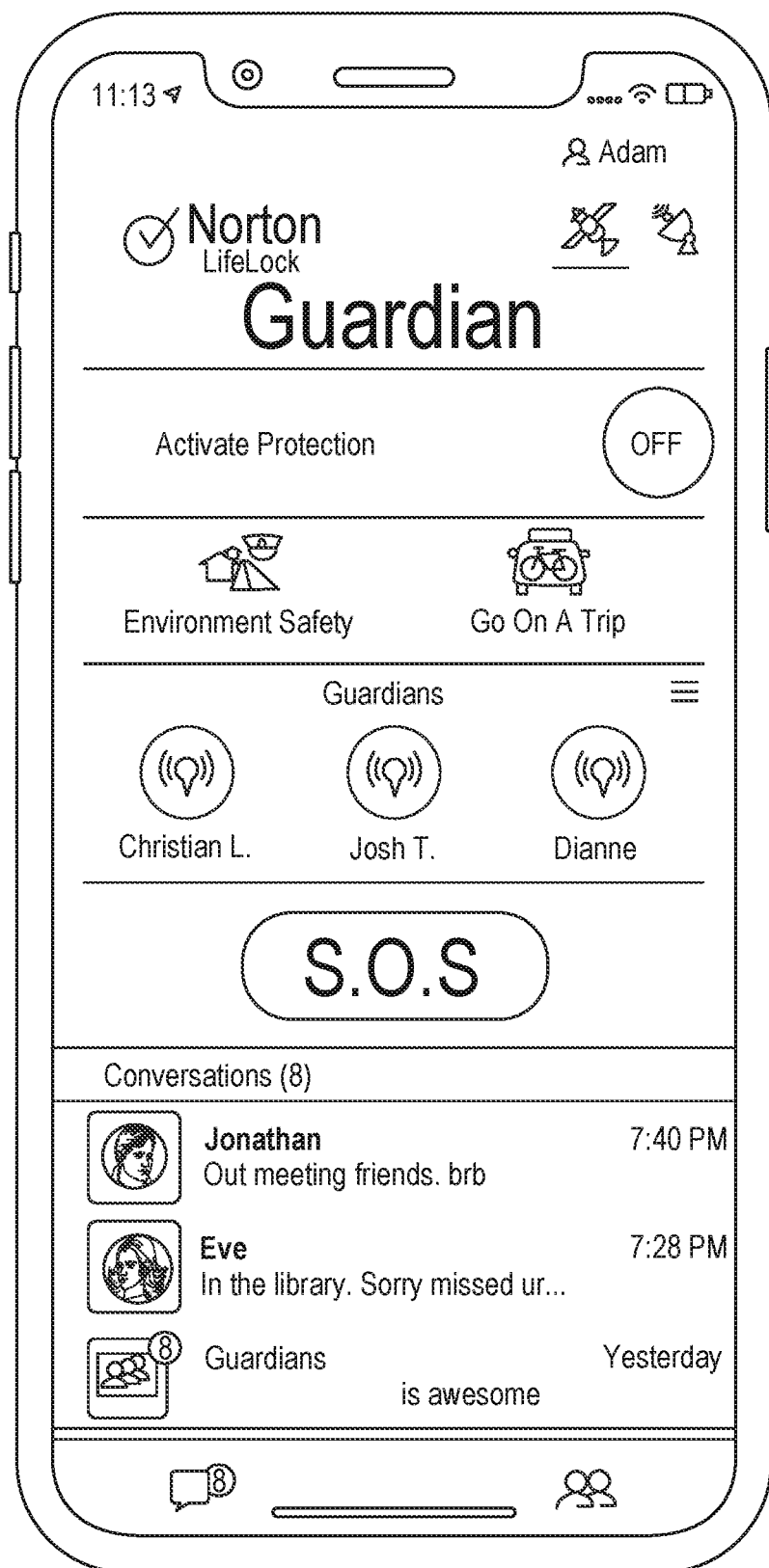
Figure 40:
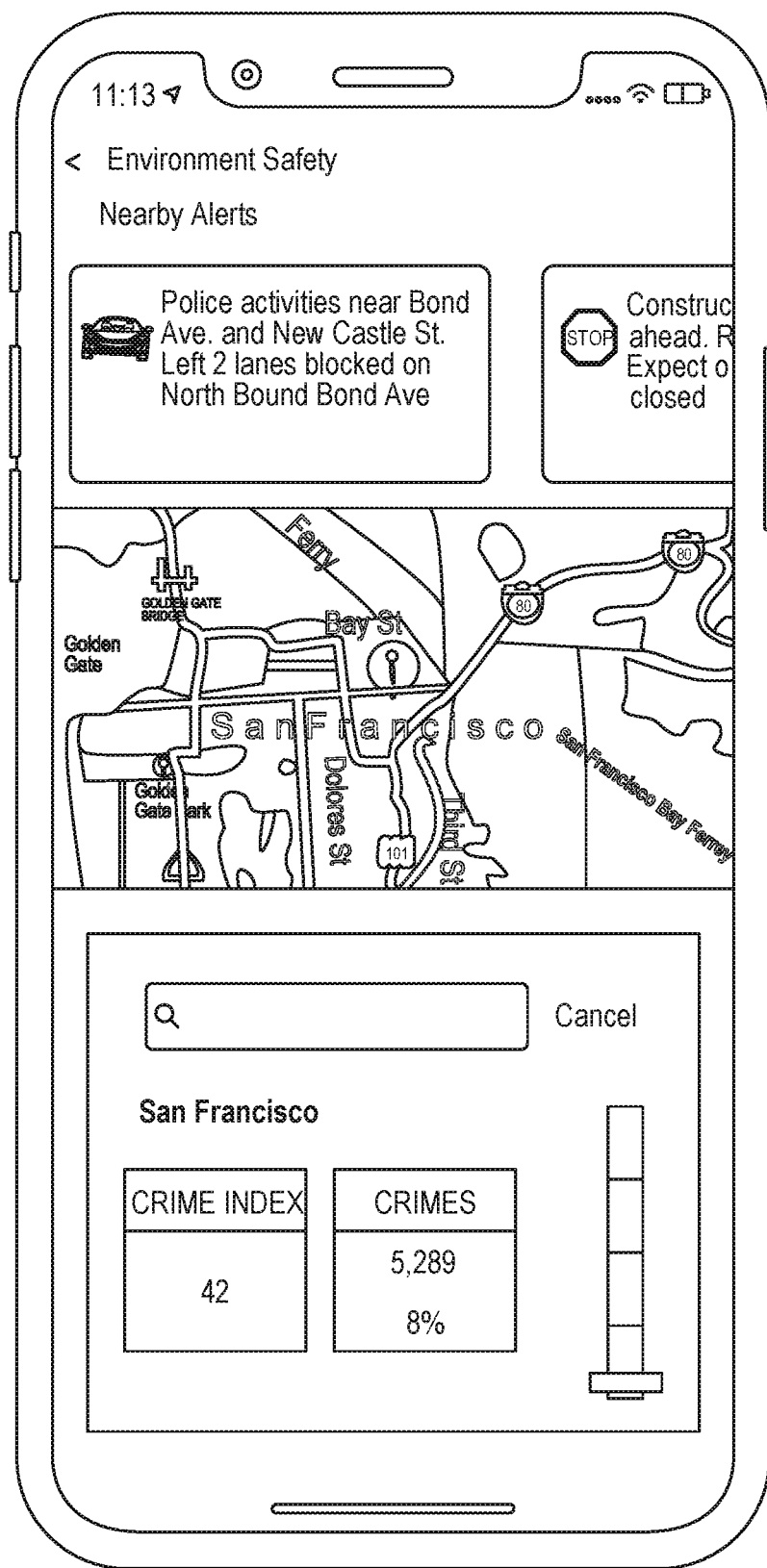

FIG. 39 shows another example of a child-side application, in coordination with a parental control system. The application of FIG. 39 may optionally execute in combination with the application first described above in connection with FIG. 20. In particular, FIG. 39 shows a graphical user interface that enables the child to select or toggle one or more potential guardians, from a list of guardians that are shown in a horizontal list within this figure (e.g., Christian L., Josh T., etc.). After toggling one or more of the guardians, the child interacting with the parental control application of FIG. 39 may also optionally toggle the button for "environment safety." Upon toggling this particular button, the graphical user interface may display a screen corresponding to FIG. 40, which may display geolocation information and/or corresponding safety reports (e.g., police, weather, and/or other bulletins regarding safety in connection with that particular geolocation of the child). In particular, FIG. 40 shows an illustrative graphical user interface that displays items of information regarding the safety of the child in connection with the geolocation of the child. These items of information include a geolocation indicator (e.g., "San Francisco"), as well as items of information indicating a crime index, indicating a total number of crimes, and/or a percentage of victims of crime, etc.

Returning to the example of FIG. 39, the child may also optionally toggle a button corresponding to "Go On A Trip."

Figure 41:
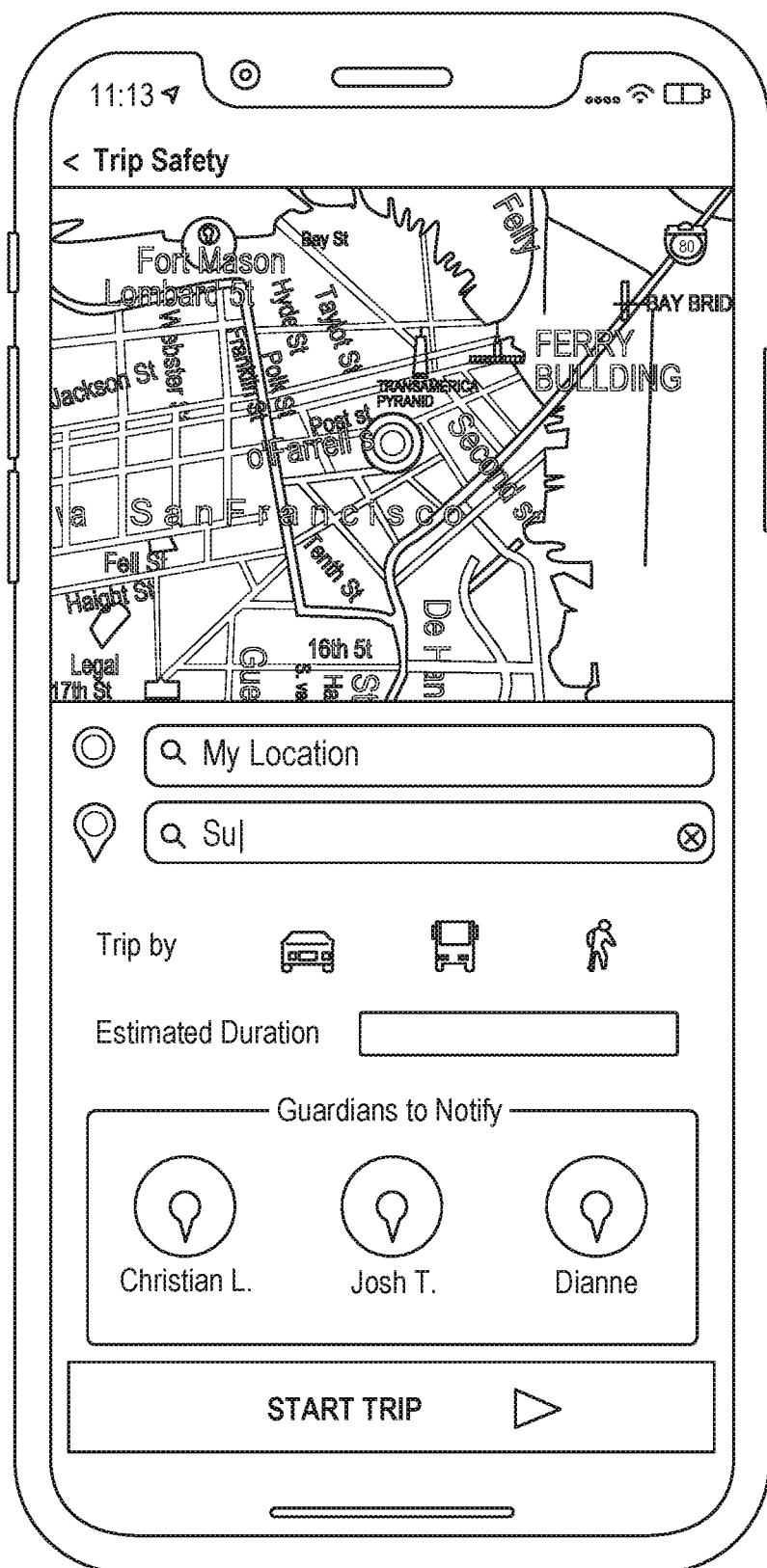

Toggling this button may further trigger the display to the child of a screen corresponding to FIG. 41. As further shown in FIG. 41, the child-side application may display to the child fields of input enabling the child to enter information regarding the details of a trip that the child is planning to take. For example, the graphical user interface may display to the child a destination field, in which the child may specify an indicator of a geolocation destination to which the child is intended to arrive at. The graphical user interface of FIG. 41 may also display buttons thereby enabling the child to designate whether the child will be completing the trip by foot, by car, by bus, by bicycle, etc. The graphical user interface of FIG. 41 may also display an indication of the guardians that the child previously selected within the graphical user interface of FIG. 39. These are the guardians who will optionally be notified, according to the parental control system, of items of information regarding the trip that the child has planned, including updates on the child's geolocation and indications of whether the child completed the intended trip within the intended amount of time. Similarly, the graphical user interface of FIG. 41 may display a field of input enabling the child to specify an amount of time over which the trip is expected to elapse. Accordingly, the failure of the child to arrive at the specified geolocation destination within the amount of time specified by the child (or otherwise calculated by the parental control system) may thereby trigger an alert or warning, which may further be transmitted to one or more guardians, including the guardians that the child previously selected, as further discussed above. The child may also specifically trigger the "trip" monitoring functionality by toggling the "START TRIP" button that is displayed at the bottom of the graphical user interface of FIG. 41. Of course, in other alternative examples, the trip monitoring, detecting, and/or alerting functionality as described above in connection with a parental control system for a child, may also be applied to adults to protect them when they intend to travel across one or more areas while potentially encountering one or more risks or dangers (e.g., the "trip" functionality described above is not necessarily limited in application to protecting children as distinct from adults).

Figure 42:
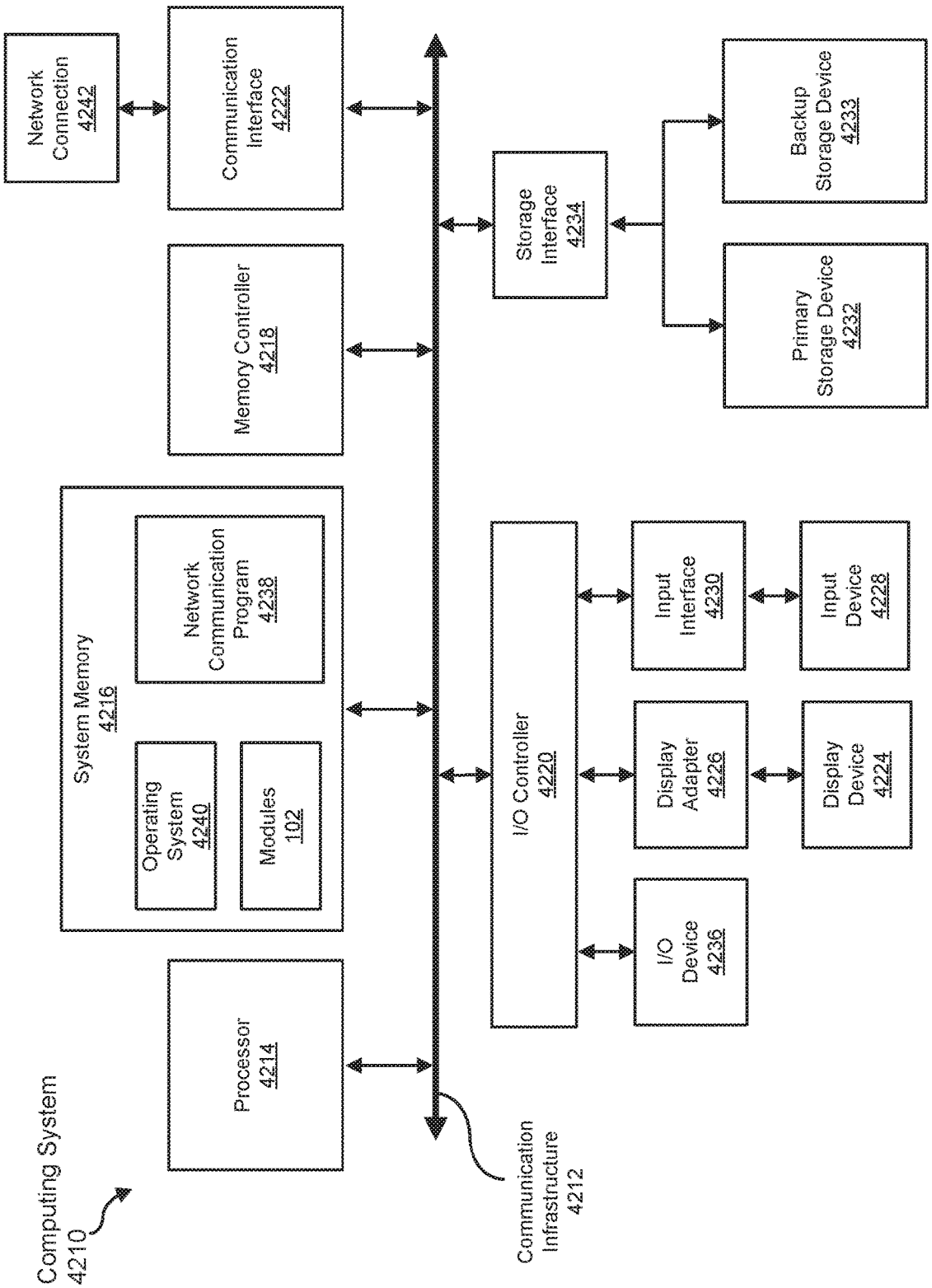
FIG. 42 is a block diagram of an example computing system capable of implementing one or more of the embodiments described and/or illustrated herein.
Figure 43:
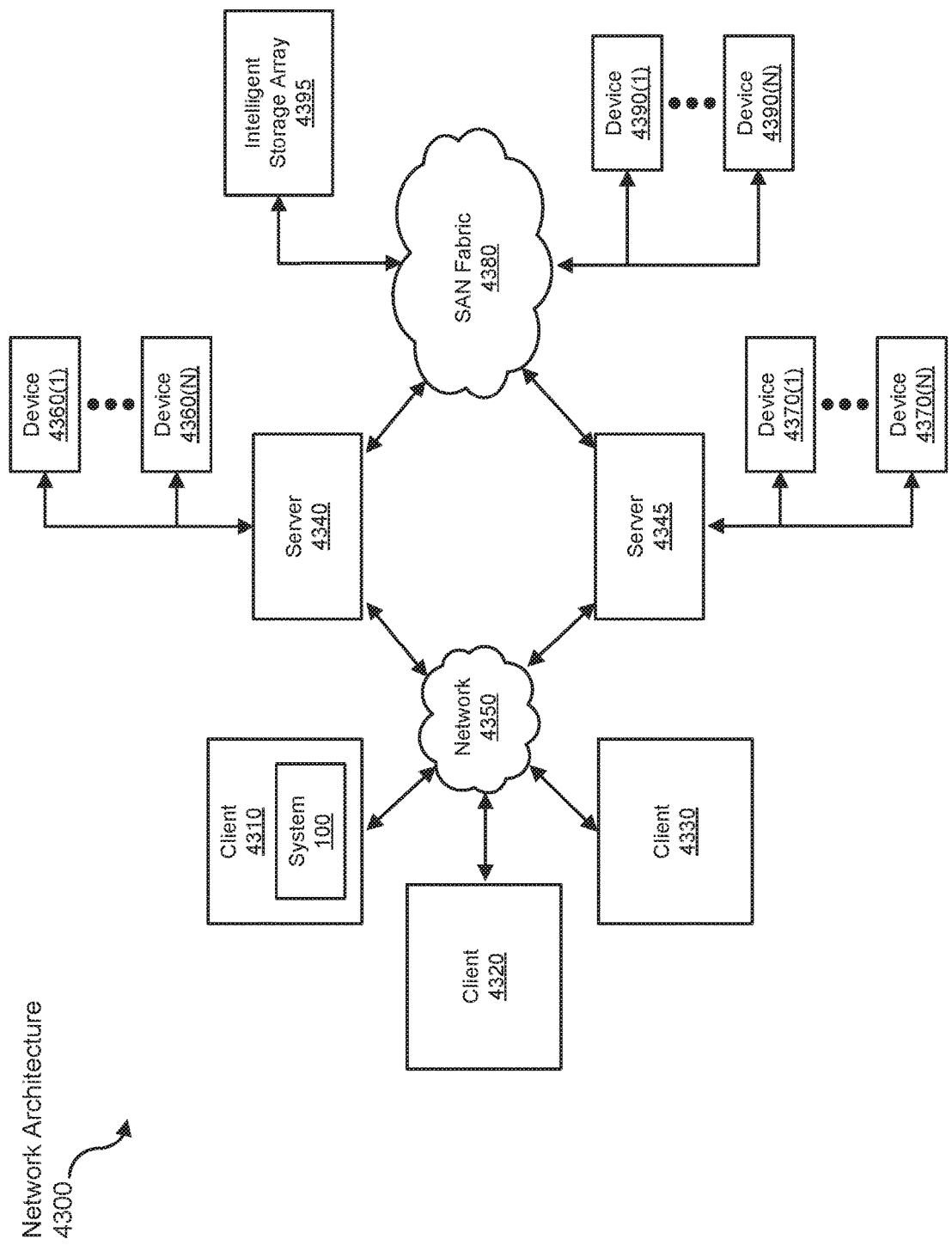
FIG. 43 is a block diagram of an example computing network capable of implementing one or more of the embodiments described and/or illustrated herein.

FIG. 42 is a block diagram of an example computing system 4210 capable of implementing one or more of the embodiments described and/or illustrated herein. For example, all or a portion of computing system 4210 may perform and/or be a means for performing, either alone or in combination with other elements, one or more of the steps described herein (such as one or more of the steps illustrated in FIG. 2). All or a portion of computing system 4210 may also perform and/or be a means for performing any other steps, methods, or processes described and/or illustrated herein.

Computing system 4210 broadly represents any single or multi-processor computing device or system capable of executing computer-readable instructions. Examples of computing system 4210 include, without limitation, workstations, laptops, client-side terminals, servers, distributed computing systems, handheld devices, or any other computing system or device. In its most basic configuration, computing system 4210 may include at least one processor 4214 and a system memory 4216.

Processor 4214 generally represents any type or form of physical processing unit (e.g., a hardware-implemented central processing unit) capable of processing data or interpreting and executing instructions. In certain embodiments, processor 4214 may receive instructions from a software application or module. These instructions may cause processor 4214 to perform the functions of one or more of the example embodiments described and/or illustrated herein.

System memory 4216 generally represents any type or form of volatile or non-volatile storage device or medium capable of storing data and/or other computer-readable instructions. Examples of system memory 4216 include, without limitation, Random Access Memory (RAM), Read Only Memory (ROM), flash memory, or any other suitable memory device. Although not required, in certain embodiments computing system 4210 may include both a volatile memory unit (such as, for example, system memory 4216) and a non-volatile storage device. In one example, one or more of modules 102 from FIG. 1 may be loaded into system memory 4216.

In some examples, system memory 4216 may store and/or load an operating system 4240 for execution by processor 4214. In one example, operating system 4240 may include and/or represent software that manages computer hardware and software resources and/or provides common services to computer programs and/or applications on computing system 4210. Examples of operating system 4240 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 4210 may also include one or more components or elements in addition to processor 4214 and system memory 4216. For example, as illustrated in FIG. 42, computing system 4210 may include a memory controller 4218, an Input/Output (I/O) controller 4220, and a communication interface 4222, each of which may be interconnected via a communication infrastructure 4212. Communication infrastructure 4212 generally represents any type or form of infrastructure capable of facilitating communication between one or more components of a computing device. Examples of communication infrastructure 4212 include, without limitation, a communication bus (such as an Industry Standard Architecture (ISA), Peripheral Component Interconnect (PCI), PCI Express (PCIe), or similar bus) and a network.

Memory controller 4218 generally represents any type or form of device capable of handling memory or data or controlling communication between one or more components of computing system 4210. For example, in certain embodiments memory controller 4218 may control communication between processor 4214, system memory 4216, and I/O controller 4220 via communication infrastructure 4212.

As illustrated in FIG. 42, computing system 4210 may also include at least one display device 4224 coupled to I/O controller 4220 via a display adapter 4226. Display device 4224 generally represents any type or form of device capable of visually displaying information forwarded by display adapter 4226. Similarly, display adapter 4226 generally represents any type or form of device configured to forward graphics, text, and other data from communication infrastructure 4212 (or from a frame buffer, as known in the art) for display on display device 4224.

As detailed above, computing system 4210 and/or one or more components of network architecture 4300 may perform and/or be a means for performing, either alone or in combination with other elements, one or more steps of an example method for protecting users.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting users, at least a portion of the method being performed by a computing device comprising at least one processor, the method comprising:
   receiving, at an online social network from a first member of the online social network, a request to delegate an access right to an Internet-of-Things device possessed by the first member to a second member within the online social network to which the first member is connected as a social contact; and
   granting, through the online social network, the request to delegate the access right to the Internet-of-Things device to the second member to provide the second member with at least a limited ability to interact with the Internet-of-Things device possessed by the first member of the online social network.

2. The computer-implemented method of claim 1, wherein the online social network maintains a registry that matches registered user accounts of the online social network to delegation rights for Internet-of-Things devices.

3. The computer-implemented method of claim 1, wherein the Internet-of-Things device is owned by the first member of the online social network.

4. The computer-implemented method of claim 1, wherein the online social network functions as a cloud-based proxy security service that masks at least one implementation detail for delegating the access right from the second member to protect a level of privacy of the first member of the online social network.

5. The computer-implemented method of claim 4, wherein the implementation detail comprises a local area network administrator login credential.

6. The computer-implemented method of claim 4, wherein the implementation detail comprises a geolocation identifier of the Internet-of-Things device.

7. The computer-implemented method of claim 4, wherein the implementation detail comprises an Internet protocol address corresponding to the Internet-of-Things device.

8. The computer-implemented method of claim 4, wherein the implementation detail comprises an identifier of one Internet service provider that provides connectivity to the Internet-of-Things device.

9. The computer-implemented method of claim 1, wherein the online social network provides the limited ability to interact with the Internet-of-Things device to the second member through an application connecting the second member to the online social network.

10. The computer-implemented method of claim 1, wherein the online social network provides the limited ability to interact with the Internet-of-Things device without opening a port on a firewall protecting the Internet-of-Things device.

11. A system for protecting users, the system comprising:
   a reception module, stored in memory, that receives, at an online social network from a first member of the online social network, a request to delegate an access right to an Internet-of-Things device possessed by the first member to a second member within the online social network to which the first member is connected as a social contact;
   a granting module, stored in memory, that grants, through the online social network, the request to delegate the access right to the Internet-of-Things device to the second member to provide the second member with at least a limited ability to interact with the Internet-of-Things device possessed by the first member of the online social network; and
   at least one physical processor configured to execute the reception module and the granting module.

12. The system of claim 11, wherein the online social network maintains a registry that matches registered user accounts of the online social network to delegation rights for Internet-of-Things devices.

13. The system of claim 11, wherein the Internet-of-Things device is owned by the first member of the online social network.

14. The system of claim 11, wherein the online social network functions as a cloud-based proxy security service that masks at least one implementation detail for delegating the access right from the second member to protect a level of privacy of the first member of the online social network.

15. The system of claim 14, wherein the implementation detail comprises a local area network administrator login credential.

16. The system of claim 14, wherein the implementation detail comprises a geolocation identifier of the Internet-of-Things device.

17. The system of claim 14, wherein the implementation detail comprises an Internet protocol address corresponding to the Internet-of-Things device.

18. The system of claim 14, wherein the implementation detail comprises an identifier of one Internet service provider that provides connectivity to the Internet-of-Things device.

19. The system of claim 11, wherein the online social network provides the limited ability to interact with the Internet-of-Things device to the second member through an application connecting the second member to the online social network.

20. A non-transitory computer-readable medium encoded with computer-executable instructions that, when executed by a physical processor of a computing device, cause the computing device to perform a method comprising:

receiving, at an online social network from a first member of the online social network, a request to delegate an access right to an Internet-of-Things device possessed by the first member to a second member within the online social network to which the first member is connected as a social contact; and granting, through the online social network, the request to delegate the access right to the Internet-of-Things device to the second member to provide the second member with at least a limited ability to interact with the Internet-of-Things device possessed by the first member of the online social network.

\* \* \* \* \*